(12) United States Patent
Rekimoto

(10) Patent No.: US 8,145,255 B2
(45) Date of Patent: Mar. 27, 2012

(54) LOCATION STORAGE DEVICE, WIRELESS TERMINAL, LOCATION STORAGE SYSTEM, LOCATION REGISTRATION METHOD, LOCATION UPDATE METHOD AND PROGRAM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 346 days.

(21) Appl. No.: 12/445,872

(22) PCT Filed: Oct. 9, 2007

(86) PCT No.: PCT/JP2007/069662
§ 371 (c)(1),
(2), (4) Date: Apr. 16, 2009

(87) PCT Pub. No.: WO2008/047628
PCT Pub. Date: Apr. 24, 2008

(65) Prior Publication Data
US 2010/0317390 A1    Dec. 16, 2010

(30) Foreign Application Priority Data
Oct. 19, 2006  (JP) .................. 2006-285558

(51) Int. Cl.
H04B 7/00  (2006.01)

(52) U.S. Cl. ......... 455/524; 370/326; 370/350; 455/528

(58) Field of Classification Search .......... 455/524–528; 370/326–350
See application file for complete search history.

(56) References Cited

U.S. PATENT DOCUMENTS

| 6,636,249 B1 | 10/2003 | Rekimoto |
| 7,233,800 B2* | 6/2007 | Laroia et al. ............... 455/456.1 |
| 7,574,224 B2* | 8/2009 | Lane et al. .................... 455/502 |
| 7,953,417 B2* | 5/2011 | Laroia et al. .................. 455/450 |

(Continued)

FOREIGN PATENT DOCUMENTS

JP    2000-194726    7/2000

(Continued)

OTHER PUBLICATIONS

Office Action of counterpart Japanese Application No. 2006-285558, Issue date of Nov. 1, 2011 (4 pages).

*Primary Examiner* — Lam T Mai
(74) *Attorney, Agent, or Firm* — Finnegan, Henderson, Farabow, Garrett & Dunner, L.L.P.

(57) ABSTRACT

It is characterized by including a storage section (214) in which location information of a base station (30) that performs wireless communication with a wireless terminal (40) and base station identification information uniquely assigned to each base station are registered in association with each other, a receiving section for receiving signal strength information in which a signal strength of a signal received by the wireless terminal from each base station or information obtained from the signal strength and the base station identification information of the base station that transmitted the signal are associated with each other, a registration judging section (222) judging, by referring to the base station identification information registered in the storage section, whether or not the base station identification information included in the signal strength information received by the receiving section is registered in the storage section in association with the location information, and a registering section (226) for registering in the storage section in association with each other the base station identification information judged by the registration judging section as not registered in the storage section and predetermined location information dependent on the location of the wireless terminal.

21 Claims, 16 Drawing Sheets

U.S. PATENT DOCUMENTS

| | | | |
|---|---|---|---|
| 2004/0056902 A1 | 3/2004 | Rekimoto | |
| 2006/0089154 A1* | 4/2006 | Laroia et al. | 455/456.2 |
| 2006/0281476 A1* | 12/2006 | Lane et al. | 455/502 |
| 2007/0232327 A1* | 10/2007 | Laroia et al. | 455/456.1 |

FOREIGN PATENT DOCUMENTS

| | | |
|---|---|---|
| JP | 2001-255365 | 9/2001 |
| JP | 2006-171012 | 6/2006 |
| JP | 2006-209784 | 8/2006 |

* cited by examiner

FIG.3

| BASE STATION ID | LONGITUDE | LATITUDE |
|---|---|---|
| 30 | 135.001 | 35.49 |
| 31 | 135.002 | 35.41 |
| 32 | 135.003 | 35.50 |
| 34 | 135.002 | 35.42 |
| ⋮ | ⋮ | ⋮ |

FIG.4

| BASE STATION ID | SIGNAL STRENGTH |
|---|---|
| 30 | −90Dbm |
| 31 | −70Dbm |
| 32 | −80Dbm |
| ⋮ | ⋮ |

FIG.6

| BASE STATION ID | SIGNAL STRENGTH |
|---|---|
| 30 | −90Dbm |
| 31 | −70Dbm |
| 32 | −80Dbm |
| 33 | −75Dbm |
| ⋮ | ⋮ |

FIG.14A

| TIME | BASE STATION ID | SIGNAL STRENGTH |
|---|---|---|
| T1 | 30 | −90Dbm |
| | 31 | −70Dbm |
| | 32 | −80Dbm |
| | 33 | −75Dbm |
| | ... | ... |

FIG.14B

| TIME | BASE STATION ID | SIGNAL STRENGTH |
|---|---|---|
| T2 | 30 | −86Dbm |
| | 31 | −74Dbm |
| | 32 | −75Dbm |
| | 33 | −80Dbm |
| | ... | ... |

FIG.14C

| TIME | BASE STATION ID | SIGNAL STRENGTH |
|---|---|---|
| T3 | 30 | −88Dbm |
| | 31 | −78Dbm |
| | 32 | −73Dbm |
| | 33 | −83Dbm |
| | ... | ... |

FIG.15

| TIME | LONGITUDE | LATITUDE |
|------|-----------|----------|
| T1   | 135.002   | 35.47    |
| T2   | 135.003   | 35.49    |
| T3   | 135.004   | 35.51    |
| ⋮    | ⋮         | ⋮        |

LOCATION STORAGE DEVICE, WIRELESS TERMINAL, LOCATION STORAGE SYSTEM, LOCATION REGISTRATION METHOD, LOCATION UPDATE METHOD AND PROGRAM

TECHNICAL FIELD

The present invention relates to a location storage device, a wireless terminal, a location storage system, a location registration method, a location update method and a program.

BACKGROUND ART

Recently, a receiving device capable of receiving a wireless signal transmitted from a satellite is mounted on a mobile body such as a car or a mobile telephone. According to a Global Positioning System (GPS) measurement, it is possible to estimate the location of a mobile body on which such a receiving device is mounted. A location estimation technology using such a receiving device is an important common basic technology in various fields such as navigation, security, recreation, or the like. However, the location estimation technology based on the GPS measurement requires a long time for synchronization at the time of activation, and also, the technology is difficult to use indoors or underground where a wireless signal from a satellite does not reach.

Further, a technology for a Personal Handyphone System (PHS) to measure the signal strength of a signal transmitted from a base station and to estimate the self location based on the measured signal strength is disclosed in, for example, Patent Document 1. Specifically, a base station of the PHS is installed by a communications firm, and thus, the installation location is usually known. Accordingly, by measuring the signal strengths of signals transmitted from 3 or more base stations and estimating the distance between each of the base stations and the self location based on the measured signal strengths, the PHS can estimate the self location by the principle of triangulation based on the installation location of each of the base stations.

Further, a location estimation method is also conceivable in which a wireless terminal that performs wireless communication with a base station (access point) in a wireless local area network (LAN) measures the signal strength of a signal transmitted from the wireless base station, and a location estimation device capable of communicating with the wireless terminal estimates the location of the wireless terminal based on the signal strength. For example, the base station in the wireless LAN transmits a beacon at regular intervals (for example, 5 times per second) for announcing the presence of the base station in the wireless LAN to the surrounding area. The wireless terminal transmits the signal strength of such a beacon to the location estimation device, and the location estimation device can estimate the location of the wireless terminal based on the signal strength and the location of the base station in the wireless LAN that is registered in advance. According to the location estimation method described above, since the base station in the wireless LAN is also installed indoors or underground, location estimation indoors or underground which has been difficult with the location estimation technology based on the GPS measurement is possible. That is, it can be said that the location estimation method described above is a location estimation technology superior in convenience and simplicity provided base station information indicating the location of the base station in the wireless LAN installed in the periphery of the wireless terminal is registered in the location estimation device.
[Patent Document 1] JP-A-2006-171012

DISCLOSURE OF THE INVENTION

Problems to be Solved by the Invention

However, the base stations in the wireless LAN are in many cases installed by an unspecified large number of users. Accordingly, it is difficult to register in the location estimation device in advance base station information of all the base stations in the wireless LAN. Further, there is a possibility of addition or change in the installation location of the base station in the wireless LAN, and to manually update the base station information in the location estimation device every time there is the addition or the change is cumbersome.

Thus, the present invention has been achieved in view of the above-described problem, and the object of the present invention is to provide a location storage device, a wireless terminal, a location storage system, a location registration method, a location update method and a program that are new and improved, and that are capable of automatically reflecting in the base station information the actual installation state of a base station.

Means for Solving the Problems

To solve the above-described problem, according to an aspect of the present invention, there is provided a location storage device characterized by including a storage section in which location information of a base station that performs wireless communication with a wireless terminal and base station identification information uniquely assigned to each base station are registered in association with each other, a receiving section for receiving signal strength information in which a signal strength of a signal received by the wireless terminal from each base station or information obtained from the signal strength and the base station identification information of the base station that transmitted the signal are associated with each other, a registration judging section for judging, by referring to the base station identification information registered in the storage section, whether or not the base station identification information included in the signal strength information received by the receiving section is registered in the storage section in association with the location information, and a registering section for registering in the storage section in association with each other the base station identification information judged by the registration judging section as not registered in the storage section and predetermined location information dependent on the location of the wireless terminal.

With such a configuration, the receiving section receives the signal strength information in which the signal strength of a signal received by the wireless terminal from the base station or information obtained from the signal strength and the base station identification information of the base station that transmitted the signal are associated with each other. And the registration judging section extracts the base station identification information that is not registered in the storage section from the base station identification information included in the signal strength information received by the receiving section. Then, the registering section registers in the storage section the base station identification information that is not registered in the storage section that is extracted in association with the predetermined location information dependent on the location of the wireless terminal. Accordingly, the location storage device can gradually supplement the base station information stored in the storage section based on the signal strength information received from the wireless terminal. That is, the location storage device can save the trouble of manually initializing the base station information in the location storage device and can automatically acquire the actual installation state of the base station.

A location estimating section for estimating the location of the wireless terminal based on the signal strength information and the location information of the base station that is registered in the storage section may further be included, and the registering section may register in the storage section in association with each other the base station identification information judged by the registration judging section as not registered in the storage section and the location information indicating the location of the wireless terminal estimated by the location estimating section. With such a configuration, the registering section registers in the storage section in association with the location information of the wireless terminal estimated by the location estimating section the base station identification information judged by the registration judging section as not registered that is among the base station identification information included in the signal strength information received by the receiving section. Here, in reality, the base station judged as not registered and the wireless terminal are thought to be apart from each other by an estimated distance that is estimated based on the signal strength at the wireless terminal of a signal transmitted from the base station. That is, it is highly possible that the base station that is judged as not registered is installed on the circumference of a circle having the wireless terminal as the center and the estimated distance as the radius. Thus, by provisionally deciding the location of the base station judged as not registered as the estimated location of the wireless terminal, the maximum error which may occur between the actual location of the base station and the location of the base station to be registered can be suppressed.

The receiving section may further receive terminal location information indicating the location of the wireless terminal, and the registering section may register in the storage section in association with each other the base station identification information judged by the registration judging section as not registered in the storage section and the terminal location information received by the receiving section. With such a configuration, the location storage device can register in the registering section in association with the terminal location the base station identification information judged by the registration judging section as not registered in the storage section that is among the base station identification information included in the signal strength information. That is, the registering section can register in the storage section new base station information by simply using the terminal location information received by the receiving section without requiring the step of estimating the wireless terminal location based on the signal strength information by the location estimating section.

The receiving section may receive the signal strength information at one or two or more time points accumulated in the wireless terminal. With such a configuration, for example, when the wireless terminal is provided with a database for the base station information, a database for the history of the signal strength information at one or two or more time points and a location estimation function, the wireless terminal can check the self location without having to access the location storage device at the time of every location estimation. However, since the installation state of the base station changes with time, the database for the base station information needs to be updated according to the change. Thus, by transmitting at a predetermined timing the signal strength information at one or two or more time points to the location storage device from the database for the history of the signal strength information in the wireless terminal, the location storage device can newly register the base station information that is not registered in the storage section. Further, if the location storage device transmits to the wireless terminal the base station information that is newly registered in the storage section, it becomes possible to register the new base station information in the database for the base station information in the wireless terminal.

Further, to solve the above-described problem, according to another aspect of the present invention, there is provided a location storage device characterized by including a storage section in which location information of a base station that performs wireless communication with a wireless terminal and base station identification information uniquely assigned to each base station are registered in association with each other, a receiving section for receiving signal strength information in which a signal strength of a signal received by the wireless terminal from each base station or information obtained from the signal strength and the base station identification information of the base station that transmitted the signal are associated with each other, a base station information judging section for judging whether or not the location information of the base station registered in the storage section satisfies a predetermined restriction condition which is based on the distance between the wireless terminal and the base station that is estimated from the signal strength information, and an updating section for updating the location information of the base station that is judged by the base station information judging section as not satisfying the predetermined restriction condition.

With such a configuration, the base station information judging section judges whether or not the location information of the base station registered in the storage section satisfies the predetermined restriction condition which is based on the distance between the wireless terminal and the base station that is estimated from the signal strength information, and the updating section updates the location information of the base station that is judged by the base station information judging section as not satisfying the predetermined restriction condition. Accordingly, the location storage device can automatically update the base station information registered in the storage section based on the operations of the base station information judging section and the updating section. For example, even when the installation location of the base station registered in the storage section is changed, the location storage device can reflect in the base station information registered in the storage section the location of the base station whose installation location has been changed without requiring manual processing.

The base station information judging section may include an inter-base-station-distance calculating section for calculating the distance between a first base station and a second base station that perform wireless communication with the wireless terminal based on the location information of the first base station and the second base station registered in the storage section, an estimated distance adding section for adding up the distance between the wireless terminal and the first base station and the distance between the wireless terminal and the second base station that are estimated from the signal strength information, and a restriction condition judging section for judging that the restriction condition is not satisfied when there is a' difference between the distance calculated by the inter-base-station-distance calculating section and the distance calculated by the estimated distance adding section.

The restriction condition judging section may judge that the restriction condition is not satisfied when the distance calculated by the inter-base-station-distance calculating section is longer than the distance calculated by the estimated distance adding section by a set boundary value or more. With such a configuration, based on the characteristics of a triangle that the sum of the lengths of arbitrary two sides is never shorter than the length of the remaining side, the restriction condition judging section can judge that the restriction condition is not satisfied when the inter-base-station distance calculated by the inter-base-station-distance calculating section is longer than the add-up distance calculated by the estimated distance adding section. Further, by setting a set boundary value, even if the add-up distance is calculated to be shorter than the inter-base-station distance, if the difference is within the set boundary value, the restriction condition judging section can, by taking the possibility of error into consideration, judge that the restriction condition is satisfied. As a result, a case can be reduced where the updating section updates the base station information in the storage section which normally does not need to be updated.

The updating section can update the location information of the base station registered in the storage section so that the distance between the first base station and the second base station is within the range of the distance between the location indicated by the location information of the first base station and the location indicated by the location information of the second base station that are registered in the storage section and a distance that is a sum of the distance between the wireless terminal and the first base station and the distance between the wireless terminal and the second base station.

The receiving section may further receive terminal location information indicating the location of the wireless terminal, and the base station information judging section may further include a registration distance calculating section for calculating the distance between the location indicated by the terminal location information received by the receiving section and the location indicated by the location information of a certain base station registered in the storage section and a restriction condition judging section for judging that the restriction condition is not satisfied when there is a difference between the distance calculated by the registration distance calculating section and the distance between the wireless terminal and the certain base station estimated based on the signal strength corresponding to the certain base station.

The restriction condition judging section may judge that the restriction condition is not satisfied when the distance calculated by the registration distance calculating section is shorter than the distance between the wireless terminal and the certain base station estimated based on the signal strength corresponding to the certain base station. Here, it can be said that the distance between the wireless terminal and the certain base station estimated based on the signal strength is often estimated to be longer than in reality and that the distance is rarely estimated to be shorter than in reality. This is because, in the course of transmission of a signal from the base station to the wireless terminal, the signal strength often decreases more than in theory due to the signal passing through obstacles or being reflected repeatedly, but it is rare that the decrease of the signal strength is attenuated than in theory or that the signal strength is increased. With the restriction condition judging section performing judgment as described above based on such situation, the updating section can update the base station information registered in the storage section that is likely to be not reflecting the actual installation state of the base station.

The updating section may update the location information of the base station registered in the storage section so that the distance between the certain base station and the wireless terminal is within the range of the distance between the location indicated by the terminal location information received by the receiving section and the location indicated by the location information of the certain base station registered in the storage section and the distance between the wireless terminal and the certain base station estimated based on the signal strength information.

The receiving section may receive the signal strength information at one or two or more time points accumulated in the wireless terminal. With such a configuration, for example, when the wireless terminal is provided with a database for the base station information, a database for the history of the signal strength information at one or two or more time points and a location estimation function, the wireless terminal can check the self location without having to access the location storage device at the time of every location estimation. However, since the installation state of the base station changes with time, the database for the base station information needs to be updated according to the change. Thus, by transmitting at a predetermined timing the signal strength information at one or two or more time points to the location storage device from the database for the history of the signal strength information in the wireless terminal, the location storage device can update the base station information registered in the storage section. Further, if the location storage device transmits to the wireless terminal the base station information after updating that is registered in the storage section, it becomes possible to update the database for the base station information in the wireless terminal.

Further, to solve the above-described problem, according to another aspect of the present invention, there is provided a wireless terminal for performing wireless communication with a plurality of base stations, which is characterized by including a measuring section for measuring signal strengths of signals received from the plurality of the base stations, a history information storage section for storing a history of signal strength information, at one or two or more time points, in which the signal strengths measured by the measuring section or information obtained from the signal strengths and base station identification information uniquely assigned to each of the base stations are associated with each other, and a transmitting section for transmitting the history of the signal strength information stored in the history information storage section to a location storage device capable of estimating the location of the wireless terminal based on the signal strength information.

With such a configuration, the history information storage section can store the history of the signal strength information, at one or two or more time points, in which the signal strengths measured by the measuring section or information obtained from the signal strengths and the base station identification information uniquely assigned to each of the base stations are associated with each other. Accordingly, the transmitting section can collectively transmit the history of the signal strength information to the location storage device. As a result, the frequency of traffic between the wireless terminal and the location storage device is reduced. Or, based on the state of the wireless terminal, the location storage device or the traffic, the history of the signal strength information can be made to be transmitted to the location storage device when the load on the wireless terminal, the location storage device or the traffic is small.

A base station information storage section may further be included in which base station information in which location information of the plurality of the base stations and the base station identification information are associated with each other is registered, and a location estimating section for estimating the location of the wireless terminal based on the base station information registered in the base station information storage section and the signal strength information. With such a configuration, the wireless terminal can check the self location based on the base station information storage section and the location estimating section that are embedded therein without communicating with the location storage device. That is, the wireless terminal can exclude the step of accessing the location storage device at the time of every location estimation, and thus, can swiftly check the self location.

The history information storage section may further be registered a history of terminal location information indicating the location of the wireless terminal at one or two or more time points, and the transmitting section may transmit to the location storage device the signal strength information and the terminal location information. With such a configuration, the history information storage section can store the history of the signal strength information at one or two or more time points and the history of the terminal location information indicating the location of the wireless terminal at one or two or more time points. Accordingly, the transmitting section can collectively transmit to the location storage device the histories of the signal strength information and the terminal location information. As a result, the frequency of traffic between the wireless terminal and the location storage device is reduced. Or, based on the state of the wireless terminal, the location storage device or the traffic, the histories of the signal strength information and the terminal location information can be made to be transmitted to the location storage device when the load on the wireless terminal, the location storage device or the traffic is small.

An information updating section for updating base station information registered in the base station information storage section to base station information registered in a storage section of the location storage device and in which location information of the plurality of the base stations and the base station identification information uniquely assigned to each of the base stations are associated with each other may further be included. With such a configuration, when, for example, there is base station information in the storage section of the location storage device that is not registered in the base station information storage section or there is a difference between the base station information registered in the storage section of the location storage device and the base station information registered in the base station information storage section, the wireless terminal can receive the base station information from the storage section of the location storage device, and newly register the base station information in the base station information storage section or modify or update the base station information registered in the base station information storage section.

Further, to solve the above-described problem, according to another aspect of the present invention, there is provided a location storage system including a wireless terminal that performs wireless communication with a plurality of base stations and a location storage device in which locations of the plurality of the base stations are registered. The wireless terminal is characterized by including a measuring section for measuring signal strengths of signals received from the plurality of the base stations and a transmitting section for transmitting to the location storage device signal strength information, at one or two or more time points, in which the signal strengths measured by the measuring section or information obtained from the signal strengths and base station identification information uniquely assigned to each of the base stations are associated with each other. Further, the location storage device is characterized by including a storage section in which location information of the base station and the base station identification information are registered in association with each other, a receiving section for receiving the signal strength information from the wireless terminal, a registration judging section for judging, by referring to the base station identification information registered in the storage section, whether or not the base station identification information included in the signal strength information received by the receiving section is registered in the storage section, and a registering section for registering in the storage section in association with each other the base station identification information judged by the registration judging section as not registered in the storage section and predetermined location information dependent on the location of the wireless terminal.

Further, to solve the above-described problem, according to another aspect of the present invention, there is provided a location storage system including a wireless terminal that performs wireless communication with a plurality of base stations and a location storage device in which locations of the plurality of the base stations are registered. The wireless terminal is characterized by including a measuring section for measuring signal strengths of signals received from the plurality of the base stations, and a transmitting section for transmitting to the location storage device signal strength information, at one or two or more time points, in which the signal strengths measured by the measuring section or information obtained from the signal strengths and base station identification information uniquely assigned to each of the base stations are associated with each other. The location storage device is characterized by including a storage section in which location information of the base station and the base station identification information are registered in association with each other, a receiving section for receiving the signal strength information from the wireless terminal, a base station information judging section for judging whether or not the location information of the base station registered in the storage section satisfies a predetermined restriction condition which is based on the distance between the wireless terminal and the base station that is estimated from the signal strength information, and an updating section for updating the location information of the base station that is judged by the base station information judging section as not satisfying the predetermined restriction condition.

Further, to solve the above-described problem, according to another aspect of the present invention, there is provided a location registration method characterized by including the steps of registering in a storage medium in association with each other location information of a base station that performs wireless communication with a wireless terminal and base station identification information uniquely assigned to each base station, receiving signal strength information in which a signal strength of a signal received by the wireless terminal from the base station or information obtained from the signal strength and the base station identification information of the base station that transmitted the signal are associated with each other, judging, by referring to the base station identification information registered in the storage medium, whether or not the base station identification information included in the received signal strength information is registered in the storage medium, and registering in the storage medium in association with each other the base station identification information judged as not registered in the storage medium and predetermined location information dependent on the location of the wireless terminal.

Further, to solve the above-described problem, according to another aspect of the present invention, there is provided a location update method characterized by including the steps of registering in a storage medium in association with each other location information of a base station that performs wireless communication with a wireless terminal and base station identification information uniquely assigned to each base station, receiving signal strength information in which a signal strength of a signal received by the wireless terminal from the base station or information obtained from the signal strength and the base station identification information of the base station that transmitted the signal are associated with each other, judging whether or not the location information of the base station registered in the storage medium satisfies a predetermined restriction condition which is based on the distance between the wireless terminal and the base station that is estimated from the signal strength information, and updating the location information of the base station that is judged as not satisfying the predetermined restriction condition.

Further, to solve the above-described problem, according to another aspect of the present invention, there is provided a program for causing a computer to function as a location storage device including a receiving section for receiving signal strength information in which a signal strength of a signal received by a wireless terminal from each base station that performs wireless communication with the wireless terminal or information obtained from the signal strength and base station identification information of the base station that transmitted the signal are associated with each other, a registration judging section for judging, by referring to the base station identification information registered in a storage medium in association with location information of the base station, whether or not the base station identification information included in the signal strength information received by the receiving section is registered in the storage medium, and a registering section for registering in the storage medium in association with each other the base station identification information judged by the registration judging section as not registered in the storage medium and predetermined location information dependent on the location of the wireless terminal.

Further, to solve the above-described problem, according to another aspect of the present invention, there is provided a program for causing a computer to function as a location storage device including a receiving section for receiving signal strength information in which a signal strength of a signal received by a wireless terminal from each base station that performs wireless communication with the wireless terminal or information obtained from the signal strength and base station identification information of the base station that transmitted the signal are associated with each other, a base station information judging section for judging whether or not location information of the base station registered in a storage medium in association with the base station identification information of the base station satisfies a predetermined restriction condition which is based on the distance between the wireless terminal and the base station that is obtained from the signal strength information, and an updating section for updating the location information of the base station that is judged by the base station information judging section as not satisfying the predetermined restriction condition.

Effect of the Invention

As explained above, according to the location storage device, the wireless terminal, the location storage system, the location registration method, the location update method and the program according to the present invention, the actual installation state of the base station can be automatically reflected in the base station information.

BRIEF DESCRIPTION OF THE DRAWINGS

FIG. 3 It is an explanatory diagram showing an example of base station information stored in a storage section.

FIG. 4 It is an explanatory diagram showing an example of signal strength information received by a location estimating section from a wireless terminal.

FIG. 6 It is an explanatory diagram showing an example of signal strength information received by a location estimating section from a wireless terminal.

FIG. 14A It is an explanatory diagram showing a history of signal strength information stored in a history information storage section.

FIG. 14B It is an explanatory diagram showing a history of signal strength information stored in the history information storage section.

FIG. 14C It is an explanatory diagram showing a history of signal strength information stored in the history information storage section.

FIG. 15 It is an explanatory diagram showing a history of terminal location information stored in the history information storage section.

BEST MODE FOR CARRYING OUT THE INVENTION

Hereunder, a preferred embodiment of the present invention will be described in detail with reference to the appended drawings. Incidentally, in the present specification and drawings, as for configuration elements having substantially the same functional configuration, the same numeral is used and the repeated explanation will be omitted.

First Embodiment

First, a location estimation system 10 according to a first embodiment of the present invention will be explained. With the location estimation system 10 as an example of the location estimation system according to the present embodiment, a location estimation device 20 configuring the location estimation system 10 has significant characteristics. Specifically, the location estimation device 20 has a function of estimating the location of a wireless terminal 40 in cooperation with the wireless terminal 40 that performs wireless communication with a plurality of base stations, a function of, when a new base station is perceived, registering location information of the base station, and a function of updating the registered location information of the base stations. Hereunder, an explanation will be made using FIGS. 1 to 12.

Figure 1:
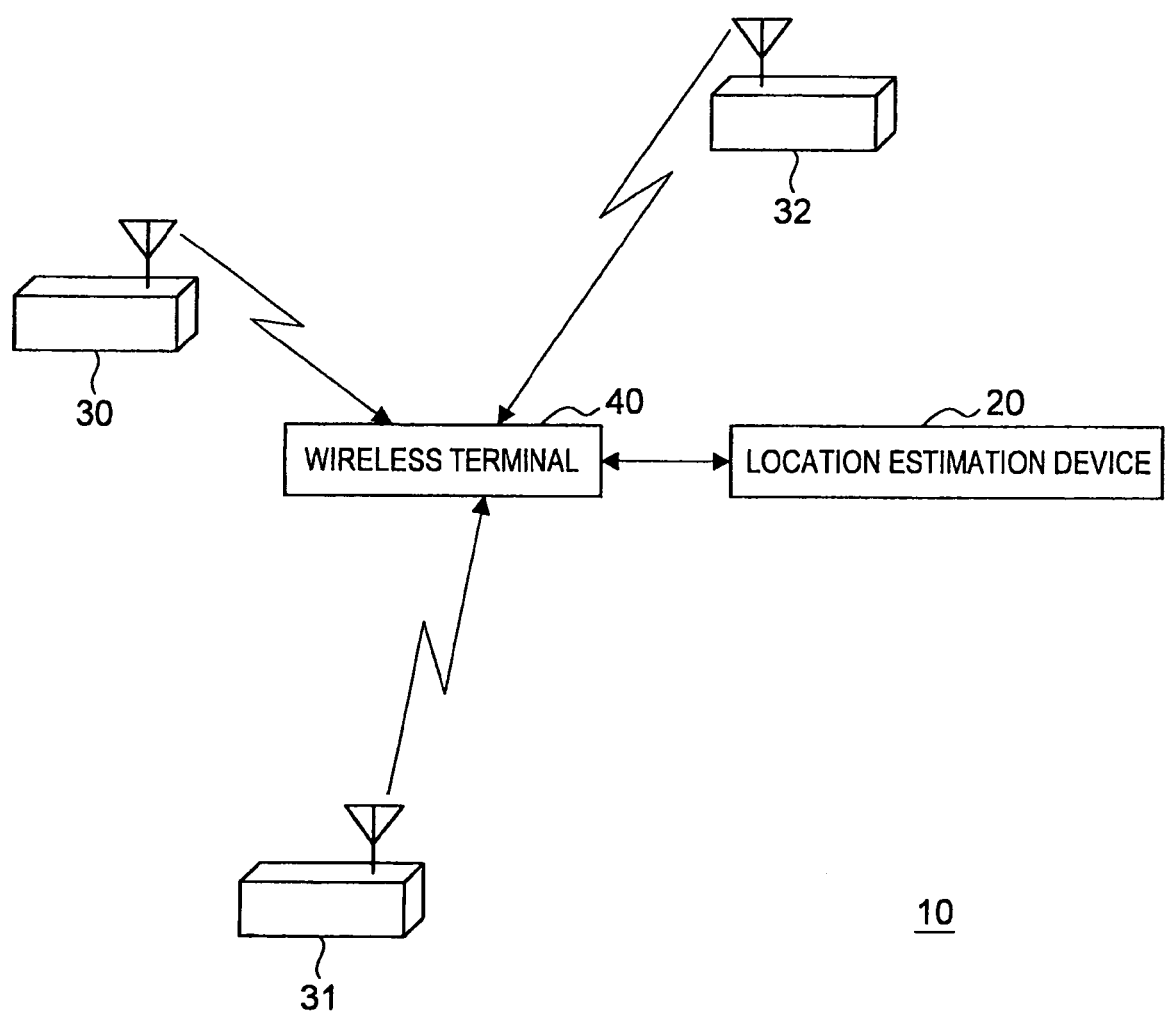
FIG. 1 It is an explanatory diagram showing a configuration of a location estimation system according to a first embodiment of the present invention.

FIG. 1 is an explanatory diagram showing a configuration of the location estimation system 10 according to the present embodiment. The location estimation system 10 includes the location estimation device 20, base stations 30, 31 and 32, and the wireless terminal 40.

The base stations 30, 31 and 32 relay communications between spatially scattered communication devices. For example, the base stations 30, 31 and 32 can relay wireless communications between the wireless terminal 40 and another wireless terminal (not shown) within respective wave coverages or relay communication between a communication device connected by wire to the base station 30, 31 or 32 and the wireless terminal 40. Specifically, the base station 30 can be a base station in a wireless local area network (LAN) based on the Wireless Fidelity (WiFi) standards, a base station in the Global System for Mobile Communications (GSM), or a Bluetooth base station. Note that the configurations of the base stations 30, 31 and 32 are substantially the same, and hereunder, an explanation will be made especially with the base station 30 as an example.

The base station 30 can transmit periodically a beacon signal for announcing the presence of the base station 30 to the surrounding area, in addition to a signal that is transmitted at the time of relaying a wireless communication. The beacon signal includes, for example, a base station ID as base station identification information uniquely assigned to the base station 30. As a result, the wireless terminal 40 can, based on the base station ID in the received beacon signal, perceive the existence of the base station 30 existing in its periphery.

The wireless terminal 40 can transmit and receive various data based on the wireless communication controlled by the base station 30. For example, the wireless terminal 40 can receive content data from a content delivery server (not shown) via the base station 30 or transmit/receive an email to/from another wireless terminal (not shown). Note that the content data can be audio data such as music, a lecture, a radio program or the like, video data such as a motion picture, a television program, a video program, a photograph, a painting, a chart or the like, or arbitrary data such as a game, software or the like.

Further, such a wireless terminal 40 can be, for example, an information processing device such as a personal computer (PC), a home video processing device (a DVD recorder, a video cassette recorder, or the like), a mobile telephone, a Personal Handyphone System (PHS), a portable audio playback device, a portable video processing device, a personal digital assistant (PDA), a home game machine, a portable game machine, a home appliance, or the like.

Further, when a signal (for example, a beacon signal) transmitted from the base station 30, 31 or 32 is received, the wireless terminal 40 can measure the signal strength of the signal, associate the measured signal strength with the base station ID of the base station 30, 31 or 32, and transmit the same as signal strength information to the location estimation device 20.

The location estimation device 20 stores in advance base station information in which installation location information of the base stations 30, 31 and 32 and the base station IDs are associated with each other, and has a function of estimating the location of the wireless terminal 40 based on the signal strength information received from the wireless terminal 40 and the base station information by, for example, the principle of triangulation. The location estimation device 20 notifies the estimated location to the wireless terminal 40, and the wireless terminal 40 can recognize the self location. Note that the location estimation device 20 can respond to a location estimation request not only from the wireless terminal 40, but also from a plurality of other wireless terminals.

Further, the location estimation device 20 according to the present embodiment has its characteristic in that, when a base station is newly installed or when the location of a base station is changed, the contents of the stored base station information can be updated accordingly to the actual installation state of the base station. Hereunder, with reference to FIG. 2, a detailed configuration of the location estimation device 20 according to the present embodiment will be explained.

Figure 2:
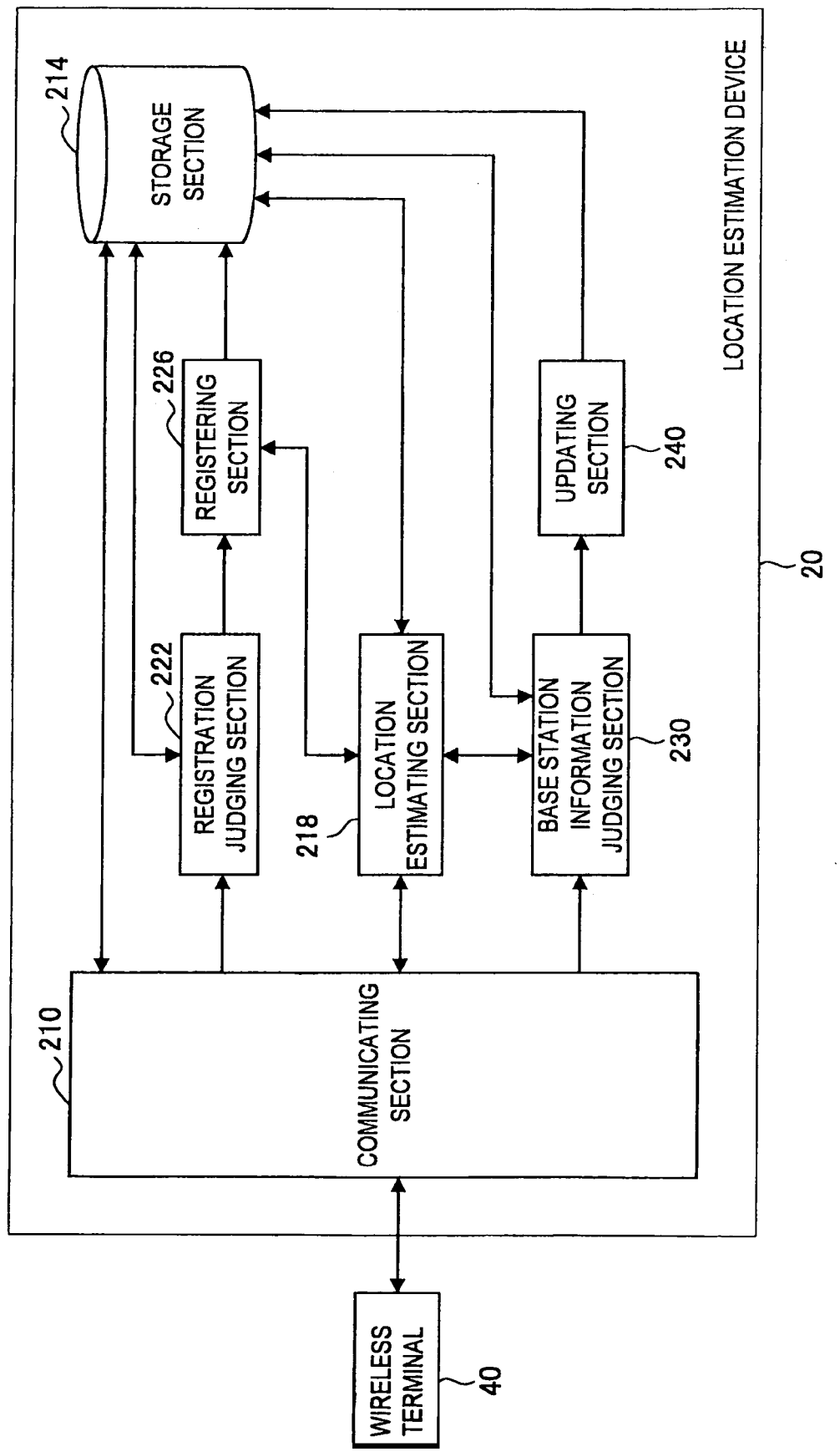
FIG. 2 It is a block diagram showing a configuration of a location estimation device according to the present embodiment.

FIG. 2 is a block diagram showing a configuration of the location estimation device 20 according to the present embodiment. The location estimation device 20 functions as a location storage device including a communicating section 210, a storage section 214, a location estimating section 218, a registration judging section 222, a registering section 226, a base station information judging section 230, and an updating section 240.

The communicating section 210 is an interface for transmitting/receiving information to/from the wireless terminal 40. The communicating section 210 has, for example, a function of a receiving section for receiving the signal strength information from the wireless terminal 40 or a function of a transmitting section for transmitting a location estimation result to the wireless terminal 40. Note that the communicating section 210 may be, the communication device 215 may be a wireless LAN compatible communication device, a wireless USB compatible device, or a wired communication device that performs communication by wire. Further, the communicating section 210 can transmit/receive information not only to/from one wireless terminal, but also to/from wireless terminals of an unspecified large number of two or more.

The storage section 214 stores as the base station information a base station ID of a base station that performs wireless communication with the wireless terminal 40 and the location information indicating the installation location of the base station in association with each other. An example of the base station information stored in the storage section 214 will be explained with reference to FIG. 3.

FIG. 3 is an explanatory diagram showing an example of the base station information stored in the storage section 214. As shown in FIG. 3, the storage section 214 stores in association with each other the base station ID, and latitude and longitude as installation location information of a base station. Specifically, the base station 30 whose base station ID is "30" is registered in the storage section 214 as being installed at longitude (east longitude) "135.001" and latitude (north latitude) "35.49."

Similarly, the base station 31 whose base station ID is "31" is registered in the storage section 214 as being installed at longitude "135.002" and latitude "35.41," the base station 32 whose base station ID is "32" as being installed at longitude "135.003" and latitude "35.50," and the base station 34 whose base station ID is "34" as being installed at longitude "135.002" and latitude "35.42." Note that, in this specification, the explanation is made with a number that is identical with the reference numeral of a corresponding base station being used as the base station ID.

Further, the form of the location information that is stored in the storage section 214 is not limited to a form using longitude and latitude. For example, it may be a form using x, y coordinates, a form using polar coordinates, or a form using vectors.

Further, the storage section 214 may be, for example, a non-volatile memory such as an electronically erasable programmable read-only memory (EEPROM), an erasable programmable read only memory (EPRPM) or the like, a magnetic disk such as a hard disk, a Floppy™ disk or the like, an optical disk such as a compact disk recordable (CD-R), a compact disk rewritable (CD-RW), a digital versatile disk recordable (DVD-R), a digital versatile disk rewritable (DVD-RW), a dual-layer digital versatile disk recordable (DVD+R), a dual-layer digital versatile disk rewritable (DVD+RW), a digital versatile disk ramdam access memory (DVD-RAM), a Blu-ray™ disc recordable (BD-R), a Blu-ray™ disc rewritable (BD-RE) or the like, or a storage medium such as a magneto-optical (MO) disk.

Returning to the explanation of FIG. 2, in response to a location estimation request from the wireless terminal 40, the location estimating section 218 estimates the location where the wireless terminal exists based on the signal strength information received from the wireless terminal 40 via the communicating section 210 and the base station information registered in the storage section 214. Hereunder, an explanation will be made in detail using FIG. 4.

FIG. 4 is an explanatory diagram showing an example of the signal strength information received by the location estimating section 218 from the wireless terminal 40. As shown in FIG. 4, the base station ID of a base station and the signal strength at the wireless terminal 40 of a signal transmitted from the base station are associated with each other in the signal strength information. FIG. 4 shows an example where the signal strength of a signal transmitted by the base station 30 whose base station ID is "30" is "−90 Dbm" at the wireless terminal 40, the signal strength of a signal transmitted by the base station 31 whose base station ID is "31" is "−70 Dbm" at the wireless terminal 40, and the signal strength of a signal transmitted from the base station 32 whose base station ID is "32" is "−80 Dbm" at the wireless terminal 40.

Note that the signal strength information is not limited to be configured as shown in FIG. 4. For example, following a predetermined rule, the signal strength of a signal transmitted from a base station decreases as it gets further away from the base station. Thus, it is possible to calculate from the signal strength of a signal at the wireless terminal 40 the distance between the base station that transmitted the signal and the wireless terminal 40. Accordingly, the signal strength information may be configured such that the base station ID of a base station and the distance between the base station and the wireless terminal 40 as information obtained from the signal strength are associated with each other.

The location estimating section 218 estimates location O of the wireless terminal 40 based on the following Equation 1 by using such signal strength information and the base station information registered in the storage section 214.

[Equation 1]

$$O = \frac{1}{W} \cdot \sum_i (Wi \cdot Ai) \qquad \text{(Equation 1)}$$

[Equation 2]

$$Wi = \frac{1}{distS(O, Ai)} \qquad \text{(Equation 2)}$$

[Equation 3]

$$W = \sum_i Wi \qquad \text{(Equation 3)}$$

In Equation 1, Ai indicates the location information of the i-th base station registered in the storage section 214. Accordingly, in a case where the base station information is to be expressed by longitude and latitude as in FIG. 3, Equation 1 is applied for longitude and latitude, respectively. Further, Wi is, as shown in Equation 2, a weighting factor obtained based on distS(O,Ai) indicating the distance between the wireless terminal 40 and the i-th base station that is estimated from the signal strength. Further, W is, as shown in Equation 3, the sum of the weighting factors.

Referring to Equation 1, the location information of a base station for which distS(O,Ai) is small is greatly reflected in location O of the wireless terminal 30. On the other hand, the location information of a base station for which distS(O,Ai) is large has little influence on location O of the wireless terminal 40. By using such Equation 1, the location estimating section 218 can logically estimate location O of the wireless terminal 40. Then, with the location estimating section 218 notifying the wireless terminal 40 of the estimated location O, it becomes possible for a user using the wireless terminal 40 to perceive his position.

Note that the location estimation method of the wireless terminal 40 is not limited to the method that uses Equation 1 described above. For example, the location of a base station which is the transmission source of a signal that is received by the wireless terminal 40 with the highest signal strength may be estimated to be the location of the wireless terminal 40. Further, a location which is to be the center of base stations which are the transmission sources of signals that are received by the wireless terminal 40 with the signal strengths of a predetermined threshold value or more may be estimated to be the location of the wireless terminal 40.

The location estimation device 20 including such a location estimating section 218 can estimate the location of the wireless terminal 40 based on, for example, the signal strength of a signal received by the wireless terminal 40 compatible with the wireless LAN from a base station in the wireless LAN. Here, it is highly possible that the base stations in the wireless LAN are installed in various places such as underground and indoors. Accordingly, in a case the wireless terminal 40 is compatible with the wireless LAN, the location estimation device 20 can estimate the location of the wireless terminal 40 regardless of the existing location of the wireless terminal 40.

On the other hand, as a prerequisite for estimating the location of the wireless terminal 40, it is necessary as described above to register in the location estimation device 20 in advance the location information of the base station.

Accordingly, in a case the wireless terminal 40 is compatible with the wireless LAN, the location estimation device 20 needs to have the location information of the base station in the wireless LAN stored in advance. However, the base stations in the wireless LAN are in many cases arbitrarily installed by an unspecified large number of users, and thus, it is difficult to have the location information of the base station in the wireless LAN registered in the location estimation device 20. Further, the installation location of the base station in the wireless LAN may be changed.

Thus, the location estimation device 20 according to the present embodiment has been achieved in view of the situation described above, and the location estimation device 20 can automatically reflect in the storage section 214 of the location estimation device 20 the actual installation state of the base station.

Hereunder, after explaining the configurations of the registration judging section 222 and the registering section 226 of the location estimation device 20 as first means for realizing the effect described above, the configurations of the base station information judging section 230 and the updating section 240 as second means will be explained.

The registration judging section 222 and the registering section 226 according to the present embodiment can, in response to a location estimation request or a location registration request from the wireless terminal 40, additionally register in the storage section 214 the base station information that is not registered. The location estimation request is for requesting the location estimation device 20 to estimate the location of the wireless terminal 40. The wireless terminal 40 transmits, along with the location estimation request, the signal strength information so that the location estimation device 20 can estimate the location of the wireless terminal 40 in response to the location estimation request. On the other hand, the location registration request is for requesting the location estimation device 20 to register the location of the wireless terminal 40. The wireless terminal 40 transmits, along with the location registration request, the signal strength information and terminal location information that indicates the location of the wireless terminal 40 so that the location estimation device 20 can execute a predetermined process in response to the location registration request.

The processing by the location estimation device 20 differs depending on which of the location estimation request and the location registration request is received. Thus, first, the processing by the registration judging section 222 and the registering section 226 in a case of the location estimation device 20 receiving the location estimation request is explained, and then, the processing by the registration judging section 222 and the registering section 226 in a case of the location estimation device 20 receiving the location registration request will be explained.

When the signal strength information that is transmitted along with the location estimation request from the wireless terminal 40 is received, the registration judging section 222 judges whether or not each base station ID included in the received signal strength information is registered in the storage section 214. Then, the registering section 226 registers in the storage section 214 in association with predetermined location information the base station ID that is included in the signal strength information and that is judged by the registration judging section 222 as not registered in the storage section 214.

Figure 5:
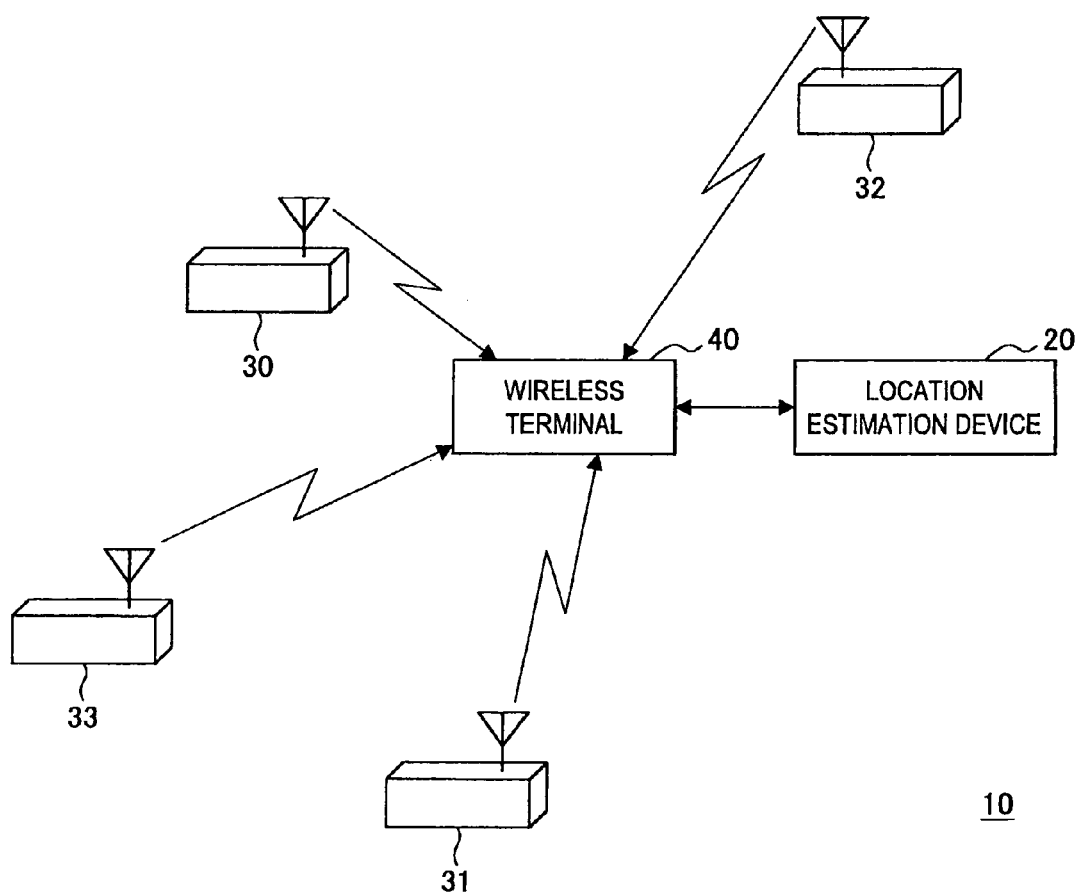
FIG. 5 It is an explanatory diagram showing another configuration example of the location estimation system according to the present embodiment.

For example, as shown in FIG. 5, a case is considered where, in addition to the base stations 30, 31 and 32, a base station 33 exists in the periphery of the wireless terminal 40. Here, as shown in FIG. 3, the base station information of the base station 33 is not registered in the storage section 214 of the location estimation device 20.

At this time, the registration judging section 222 of the location estimation device 20 receives the signal strength information as shown in FIG. 6 via the communicating section 210. That is, the registration judging section 222 is inputted with the signal strength information in which base station ID "30" of the base station 30 and the signal strength "−90 Dbm" at the wireless terminal 40 of a signal transmitted by the base station 30 are associated with each other, base station ID "31" of the base station 31 and the signal strength "−70 Dbm" at the wireless terminal 40 of a signal transmitted by the base station 31 are associated with each other, base station ID "32" of the base station 32 and the signal strength "−80 Dbm" at the wireless terminal 40 of a signal transmitted by the base station 32 are associated with each other, and further, base station ID "33" of the base station 33 and the signal strength "−75 Dbm" of a signal transmitted by the base station 33 are associated with each other.

When the signal strength information described above is received, the registration judging section 222 judges, by referring to the base station information registered in the storage section 214, that the base station information of the base stations 30, 31 and 32 is registered in the storage section 214, but the base station information of the base station 33 is not registered in the storage section 214. Accordingly, the registering section 226 is instructed to register the base station information of the base station 33 in the storage section 214.

Based on the instruction from the registration judging section 222, the registering section 226 newly registers in the storage section 214 the base station information in which base station ID "33" of the base station 33 and predetermined location information dependent on the location of the wireless terminal 40 are associated with each other. Here, in parallel with the processing by the registration judging section 222, the location estimating section 218 estimates, in response to the location estimation request, the location of the wireless terminal 40 based on the signal strength information transmitted along with the location estimation request from the wireless terminal 40. Thus, the predetermined location information described above can be made to associate with the location of the wireless terminal 40 estimated by the location estimating section 218.

In reality, it is highly possible that the base station 33 is installed at a distance corresponding to "−75 Dbm" from the wireless terminal 40. That is, it is presumed that the base station 33 is located near the circumference of a circle having the location of the wireless terminal 40 as the center and the distance corresponding to "−75 Dbm" as the radius. Here, since it is difficult to further specify the location based on the signal strength information, the registering section 226 can also register in the storage section 214 the base station information of the base station 33 assuming that the base station 33 is installed at an arbitrary location near the circumference described above. With such a configuration, while there is a case where the arbitrary location described above and the actual installation location of the base station 33 are close, there is also a case where there is a large gap between the arbitrary location and the actual installation location of the base station 33.

By contrast, as described above, with the configuration in which the registering section 226 registers in the storage section 214 in association with each other base station ID "33" and the location information indicating the location of the wireless terminal 40 estimated by the location estimating section 218, the maximum value of the gap which may occur between the actual installation location of the base station 33 and the location of the base station 33 registered in the storage section 214 may be reduced.

Note that the gap between the base station information provisionally registered in the storage section 214 and the actual installation location of the base station can be reduced by the updating section 240 described later appropriately updating the base station information registered in the storage section 214.

Next, the processing by the registration judging section 222 and the registering section 226 in a case of the location registration request being received by the location estimation device 20 will be explained.

When the location registration request described above is received, the registration judging section 222 judges, as in the case of the location estimation request, whether or not each base station ID included in the signal strength information that is transmitted along with the location registration request is registered in the storage section 214. Then, the registering section 226 registers in the storage section 214 in association with predetermined location information the base station ID that is included in the signal strength information and that is judged by the registration judging section 222 as not registered in the storage section 214.

Here, when the location estimation device 20 receives the location registration request from the wireless terminal 40, the location estimation device 20 also receives the terminal location information that expressly indicates the location of the wireless terminal 40. Accordingly, in a case where the location registration request is received, the registering section 226 can register in the storage section 214 in association with the terminal location information the base station ID that is included in the signal strength information and that is judged by the registration judging section 222 as not registered in the storage section 214.

With such a configuration, the location estimation device 20 can provisionally register in the storage section 214 the base station information of an unknown base station included in the signal strength information received from the wireless terminal 40 without going through the location estimation process for the wireless terminal 40 by the location estimating section 218.

Note that the method of the wireless terminal 40 for obtaining the terminal location information can be any method. For example, the wireless terminal 40 may obtain the terminal location information by a user input or may obtain the terminal location information based on other location estimation functions.

As explained above, the registration judging section 222 and the registering section 226 of the location estimation device 20 according to the present embodiment can register new base station information in the storage section 214 in response to the location estimation request or the location registration request from the wireless terminal 40. Accordingly, the location estimation device 20 can exclude or reduce the step of manually initializing the base station information, and can automatically acquire the actual installation state of the base station.

Next, the configurations of the base station information judging section 230 and the updating section 240 of the location estimation device 20 according to the present embodiment will be explained with reference to FIGS. 7 to 10.

The base station information judging section 230 and the updating section 240 according to the present embodiment update, in response to the location estimation request or the location registration request from the wireless terminal 40, the base station information so that the base station information registered in the storage section 214 becomes more appropriate.

Hereunder, since the processing by the location estimation device 20 differs depending on which of the location estimation request and the location registration request is received, first, the processing by the base station information judging section 230 and the updating section 240 in a case of the location estimation device 20 receiving the location estimation request is explained, and then, the processing by the base station information judging section 230 and the updating section 240 in a case of the location estimation device 20 receiving the location registration request will be explained.

Figure 7:
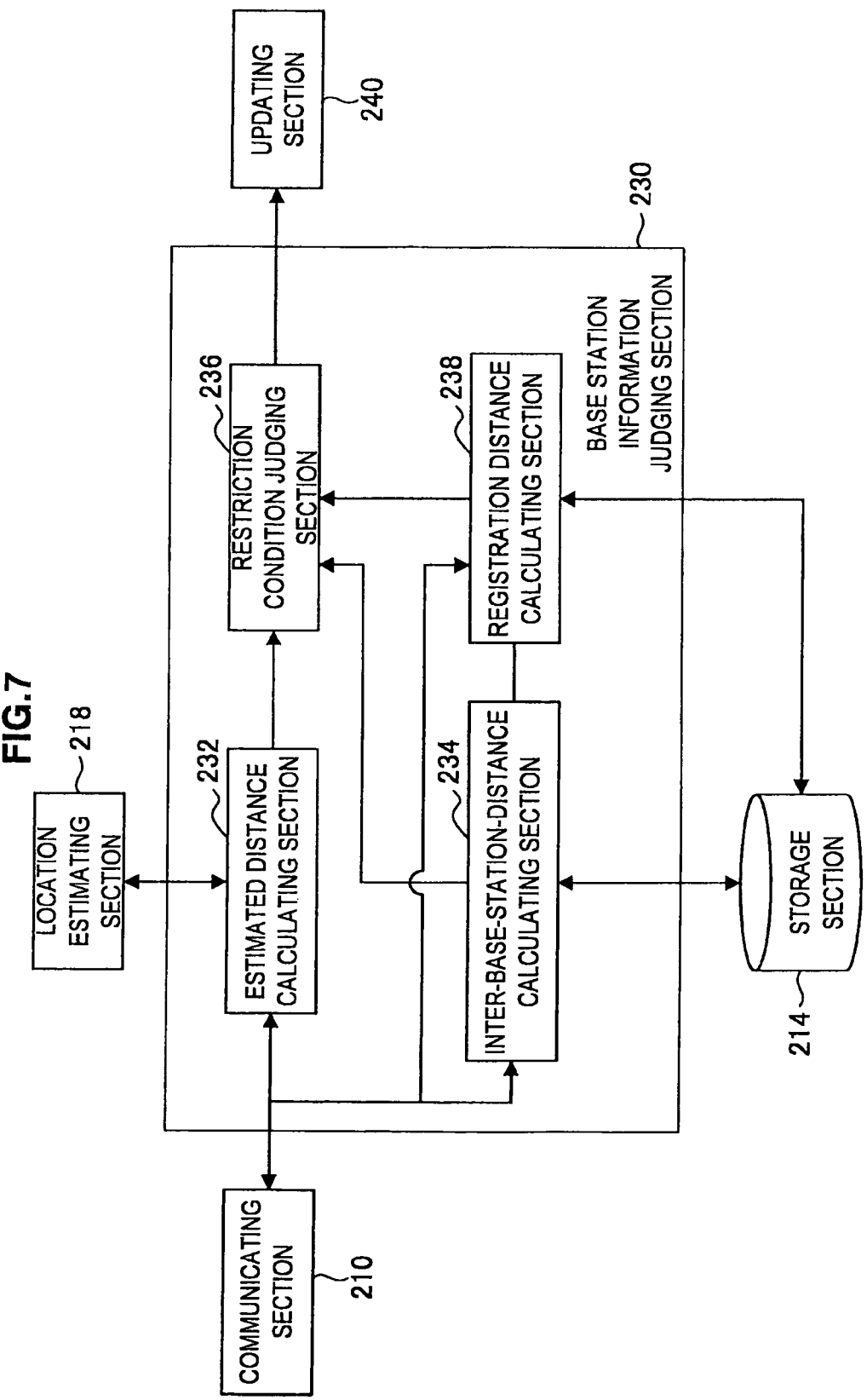
FIG. 7 It is a block diagram showing a more detailed configuration of a base station information judging section.

FIG. 7 is a block diagram showing a more detailed configuration of the base station information judging section 230. The base station information judging section 230 includes an estimated distance calculating section 232, an inter-base-station-distance calculating section 234, a registration distance calculating section 238 and a restriction condition judging section 236.

When the signal intensity information transmitted along with the location estimation request from the wireless terminal 40 is received, the estimated distance calculating section 232 functions as an estimated distance adding section that calculates an add-up distance by adding up the distance between a certain base station and the wireless terminal 40 and the distance between another certain base station and the wireless terminal 40 that are estimated based on the signal strength information. The distance between the certain base station and the wireless terminal 40 and the distance between the other certain base station and the wireless terminal 40 may be estimated by the location estimating section 218 based on the signal strength information or may be estimated by the wireless terminal 40.

Further, the estimated distance calculating section 232 can perform the calculation of the add-up distance for all the combinations of the base stations included in the received signal strength information. That is, when signal strengths of n base stations are included in the signal strength information received by the communicating section 210, the estimated distance calculating section 232 can calculate the add-up distances of a number equivalent to $(n \cdot (n-1)/2)$.

The inter-base-station-distance calculating section 234 reads out from the storage section 214 the location information of the base station corresponding to the base station ID included in the signal strength information received from the communicating section 210. Then, based on the location information of the base station read out from the storage section 214, the inter-base-station-distance calculating section 234 calculates an inter-base-station distance indicating the distance between the certain base station and the other certain base station.

Further, as in the same manner as the estimated distance calculating section 232, the inter-base-station-distance calculating section 234 can perform the calculation of the inter-base-station distance for all the combinations of the base stations included in the received signal strength information. That is, when signal strengths of n base stations are included in the signal strength information received by the communicating section 210, the inter-base-station-distance calculating section 234 can calculate the add-up distances of a number equivalent to $(n \cdot (n-1)/2)$.

The restriction condition judging section 236 judges whether or not the add-up distance calculated by the estimated distance calculating section 232 and the inter-base-station distance calculated by the inter-base-station-distance calculating section 234 satisfy a predetermined restriction condition. Hereunder, an explanation will be made on the restriction condition.

The add-up distance is, in FIG. 5, a distance in which the distance between the wireless terminal 40 and the base station 30 and the distance between the wireless terminal 40 and the base station 32 are added up, for example. Further, the inter-base-station distance is, in FIG. 5, the distance between the base station 30 and the base station 32, for example. Here, in reality, with a triangle having the wireless terminal 40, the base station 30 and the base station 32 as the vertices, the sum of the lengths of arbitrary two sides is never shorter than the length of the remaining side. Accordingly, the restriction condition judging section 236 can use the condition as shown in the following Equation 4 as the restriction condition.
[Equation 4]

$$\mathrm{dist}(Ai,Aj) \leq \mathrm{dist}S(O,Ai) + \mathrm{dist}S(O,Aj) \quad \text{(Equation 4)}$$

In Equation 4, dist(Ai,Aj) indicates the inter-base-station distance between the i-th base station and the j-th base station calculated by the inter-base-station-distance calculating section 234. Further, the right-hand side indicates the add-up distance in which the distance between the wireless terminal 40 and the i-th base station and the distance between the wireless terminal 40 and the j-th base station that are calculated by the estimated distance calculating section 232 are added up. Further, in Equation 4, it may be (i≦j).

Ideally, based on the characteristics of a triangle as described above, the add-up distance should be of a value larger than the inter-base-station distance. Accordingly, the right-hand side indicating the add-up distance and the left-hand side indicating the inter-base-station distance are joined by an inequality sign as shown in Equation 4. Upon judging that such Equation 4 is not satisfied, the restriction condition judging section 236 can judge that the location information of the i-th and j-th base stations registered in the storage section 214 does not satisfy the restriction condition.

Note that the restriction condition to be used by the restriction condition judging section 236 is not limited to that shown by Equation 4. For example, a predetermined distance may further be added to the right-hand side of Equation 4. That is, as a set boundary value, the predetermined distance can be added to the right-hand side of Equation 4. With such a configuration, the restriction condition judging section 236 judges that the restriction condition is not satisfied when the inter-base-station distance is longer than the add-up distance by the predetermined distance or more. Here, since the add-up distance is calculated based on the signal strength, when the signal strength is not accurately measured due to the surrounding environment of the wireless terminal 40, the add-up distance becomes a value that does not reflect the reality. Thus, by setting the set boundary value as described above, even if the add-up distance is calculated to be shorter than the inter-base-station distance, if the difference is within the set boundary value, the restriction condition judging section 236 can, by taking the possibility of error into consideration, judge that the restriction condition is satisfied. As a result, a case can be reduced where the updating section 240 described later updates the base station information in the storage section 214 which normally does not need to be updated. By contrast, the restriction condition judging section 236 may also judge that the restriction condition is not satisfied when there is a slightest difference between the add-up distance and the inter-base-station distance.

The updating section 240 updates the base station information registered in the storage section 214 that is judged by the base station information judging section 230 as not satisfying the restriction condition. For example, when the base station information of a certain base station and another certain station is judged by the base station information judging section 230 as not satisfying the restriction condition, the updating section 240 updates the base station information of the certain base station and the other certain base station registered in the storage section 214 so that the distance between the certain base station and the other certain base station is within the range of the add-up distance and the inter-base-station distance. Hereunder, a more concrete explanation will be made using FIG. 8.

Figure 8:
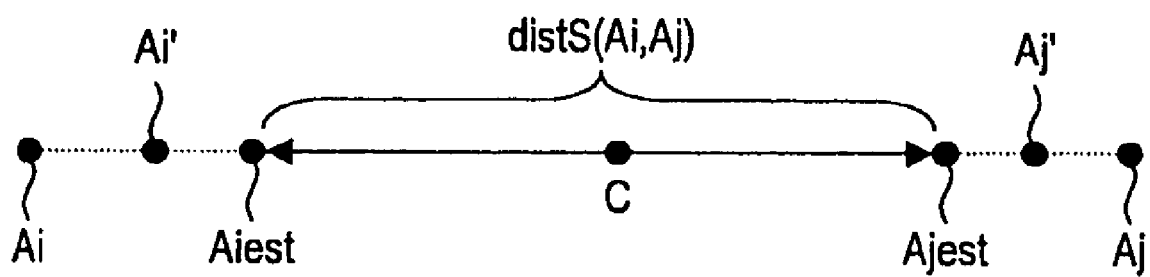
FIG. 8 It is an explanatory diagram showing a procedure of updating base station information by an updating section.

FIG. 8 is an explanatory diagram showing a procedure of updating the base station information by the updating section 240. In FIG. 8, Ai indicates the location of the i-th base station based on the base station information registered in the storage section 214, Aj indicates the location of the j-th base station based on the base station information registered in the storage section 214, distS(Ai,Aj) is equal to the right-hand side of Equation 4, C is a midpoint of the line Ai-Aj, Aiest is the end of the line on the Ai side when distS(Ai,Aj) is placed on the line Ai-Aj such that the midpoint is C, and Ajest is the end of the line of the Aj side when distS(Ai,Aj) is placed on the line Ai-Aj such that the midpoint is C. Ai' indicates the location to which the base station information of the i-th base station in the storage section 214 will be updated by the updating section 240, and Aj' indicates the location to which the base station information of the j-th base station in the storage section 214 will be updated by the updating section 240. Such Ai' and Aj' can be calculated according to Equation 5 and Equation 6.
[Equation 5]

$$Ai' = t \cdot Ai + (1-t) \cdot Aiest \quad \text{(Equation 5)}$$

[Equation 6]

$$Aj' = t \cdot Aj + (1-t) \cdot Ajest \quad \text{(Equation 6)}$$

In Equations 5 and 6, t is a coefficient determining the plasticity from Ai to Ai', and can be varied within the range of (0≦t≦1). For example, if the value of t is made large, Ai' gets closer to Ai, if the value of t is made small, Ai' is separated away from Ai, and if the value of t is made 0.5, Ai' becomes the midpoint between Ai and Aiest. The location estimation device 20 may be configured such that the value of the coefficient t that determines the plasticity can be changed based on a user setting.

As such, according to the location estimation device 20 according to the present embodiment, when the location estimation request is received from the wireless terminal 40, along with the process of estimating the location of the wireless terminal 40 and notifying the same to the wireless terminal 40, the base station information registered in the storage section 214 can be updated. Accordingly, even if the installation location of the base station registered in the storage section 214 is changed, the actual installation location of the base station can be automatically reflected in the base station information stored in the storage section 214.

Next, the processing by the base station information judging section 230 and the updating section 240 in a case of the location estimation device 20 receiving the location registration request will be explained.

When the communicating section 210 receives the location registration request from the wireless terminal 40, the estimated distance calculating section 232 estimates as the estimated distance, based on the signal strength information transmitted from the wireless terminal 40 along with the location registration request, the distance between the base station corresponding to the base station ID included in the signal strength information and the wireless terminal 40. The estimation can be executed by the location estimating section 218.

The registration distance calculating section 238 calculates as the registration distance, based on the terminal location information transmitted from the wireless terminal 40 along with the location registration request and the base station information registered in the storage section 214, the distance between the base station corresponding to the base station ID included in the signal strength information and the wireless terminal 40. To explain more specifically, the registration distance calculating section 238 reads out from the storage section 214 the location information corresponding to the base station ID included in the signal strength information, and calculates the difference between each location information that is read out and the terminal location information.

The restriction condition judging section 236 judges whether or not the estimated distance and the registration distance satisfy a predetermined restriction condition. Here, with reference to FIG. 9, a relation between the distance between the wireless terminal 40 and the base station estimated based on the signal strength received by the wireless terminal 40 and the actual distance between the wireless terminal 40 and the base station will be explained.

Figure 9:
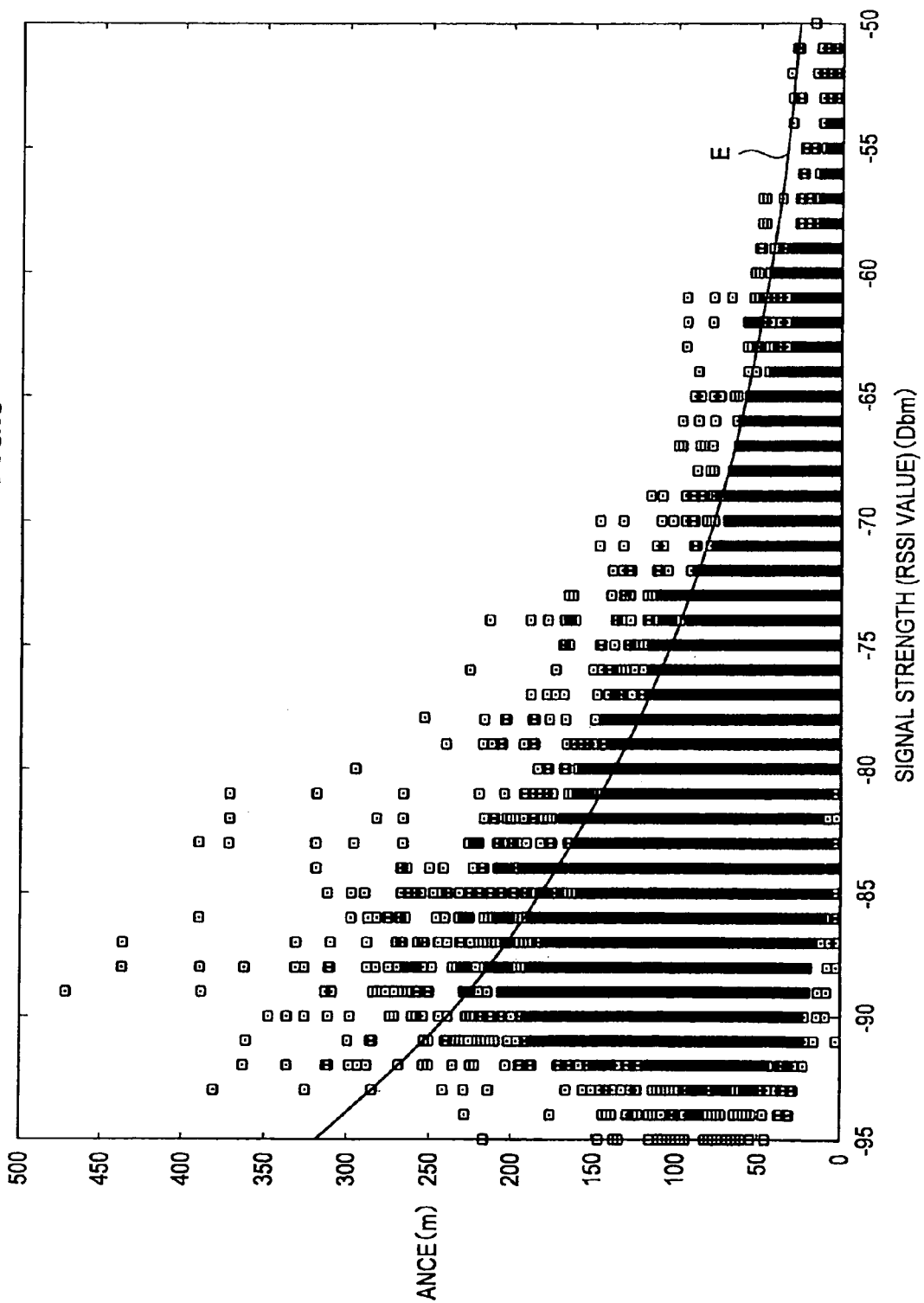
FIG. 9 It is a graph showing a relation between the distance between a wireless terminal and a base station estimated based on the signal strength and the actual distance between the wireless terminal and the base station.

FIG. 9 is a graph showing a relation between the distance between the wireless terminal 40 and the base station estimated based on the signal strength and the actual distance between the wireless terminal 40 and the base station. In FIG. 9, the horizontal axis indicates the signal strength (RSSI: Received Signal Strength Indicator) (Dbm) at the wireless terminal 40 of a signal transmitted by the base station, and the vertical axis indicates the distance (m) between the wireless terminal 40 and the base station.

In FIG. 9, the distance between the wireless terminal 40 and the base station estimated based on the signal strength is expressed by curve E. On the other hand, each plot expresses the actual distance between the wireless terminal 40 and the base station. Referring to FIG. 9, it can be confirmed that the plots expressing the actual distance between the wireless terminal 40 and the base stations are concentrated on the lower side of curve E and are scattered sparsely on the upper side of curve E.

That is, according to FIG. 9, when the distance between the wireless terminal 40 and the base station is estimated based on the signal strength, it can be said that the distance is often estimated to be longer than in reality and that the distance is rarely estimated to be shorter than in reality. This is because, in the course of transmission of a signal transmitted from the base station to the wireless terminal 40, the signal strength often decreases more than in theory due to the signal passing through obstacles or being reflected repeatedly, but it is rare that the decrease of the signal strength is attenuated than in theory or that the signal strength is increased.

Based on the characteristics of such distance estimation, the restriction condition judging section 236 can perform a judgment using the restriction condition shown in Equation 7.
[Equation 7]

$$dist(O,Ai) \leq distS(O,Ai) \quad \text{(Equation 7)}$$

In Equation 7, $dist(O,Ai)$ indicates the distance, that is, the registration distance, between location O specified by the terminal location information and location Ai of the i-th base station registered in the storage section 214. Further, in Equation 7, $distS(O,Ai)$ indicates the distance, that is, the estimated distance, between the wireless terminal 40 and the i-th base station estimated based on the signal strength information.

When the estimated distance and the registration distance do not satisfy Equation 7, the restriction condition judging section 236 judges that the base station information of the i-th base station registered in the storage section 214 does not satisfy the restriction condition.

Note that the restriction condition to be used by the restriction condition judging section 236 is not limited to Equation 7, and the restriction condition judging section 236 may use a restriction condition shown in Equation 8, for example.
[Equation 8]

$$dist(O,Ai) \neq distS(O,Ai) \quad \text{(Equation 8)}$$

When using the restriction condition shown in Equation 8, it is highly possible that the restriction condition judging section 236 judges, along with receiving the location registration request, that most of the base station information does not satisfy the restriction condition. As a result, the frequency of the updating section 240 described later updating the base station information in the storage section 214 increases, and thus, the location estimation device 20 can swiftly reflect the actual installation state of the base station in the base station information in the storage section 214.

The updating section 240 updates the base station information registered in the storage section 214 that is judged by the base station information judging section 230 as not satisfying the restriction condition. For example, when the base station information judging section 230 judges that the base station information of a certain base station does not satisfy the restriction condition, the updating section 240 updates the base station information of the certain base station registered in the storage section 214 so that the distance between the certain base station and the wireless terminal 40 is within the range of the estimated distance and the registration distance. Hereunder, an explanation will be made more specifically using FIG. 10.

Figure 10:
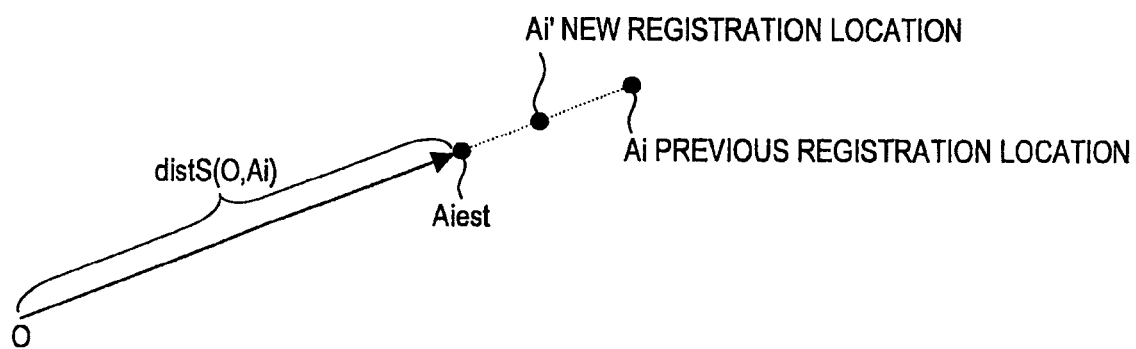
FIG. 10 It is an explanatory diagram showing a procedure of updating base station information by an updating section.

FIG. 10 is an explanatory diagram showing a procedure of updating the base station information by the updating section 240. In FIG. 10, Ai indicates the location of the i-th base station based on the base station information registered in the storage section 214, O is the location indicated by the terminal location information, $dist(O,Ai)$ indicates the estimated distance between the wireless terminal 40 and the i-th base station estimated based on the signal strength information, and Aiest indicates the location of the end of the line on the Ai side in a case $dist(O,Ai)$ is placed on the line O-Ai from location O. Further, Ai indicates the location to which the base station information of the i-th base station in the storage section 214 will be updated by the updating section 240. Such Ai' can be calculated according to the following Equation 9.
[Equation 9]

$$Ai' = t \cdot Ai + (1-t) \cdot Aiest \quad \text{(Equation 9)}$$

In Equation 9, t is a coefficient determining the plasticity from Ai to Ai', and can be varied within the range of ($0 \leq t \leq 1$). For example, if the value of t is made large, Ai' gets closer to Ai, if the value of t is made small, Ai' is separated away from Ai, and if the value of t is made 0.5, Ai' becomes the midpoint between Ai and Aiest. The location estimation device 20 can be configured such that the value of the coefficient t that determines the plasticity can be changed based on a user setting.

As explained above, according to the base station information judging section 230 and the updating section 240 of the location estimation device 20 according to the present embodiment, the base station information registered in the storage section 214 can be automatically updated in response to the location estimation request or the location registration request from the wireless terminal 40. Accordingly, even if the installation location of the base station registered in the storage section 214 is changed, the actual installation location of the base station can be gradually reflected in the storage section 214.

Incidentally, the function of the communicating section 210 described above can be realized by a CPU executing the program for controlling a communication device. Further, based on a computer program for causing a computer to realize the operation of the location estimating section 218, the registration judging section 222, the registering section 226, the base station information judging section 230 or the updating section 240, hardware resources such as a CPU, a ROM, a RAM and the like can be made to function as each of the above-described configurations.

Figure 11:
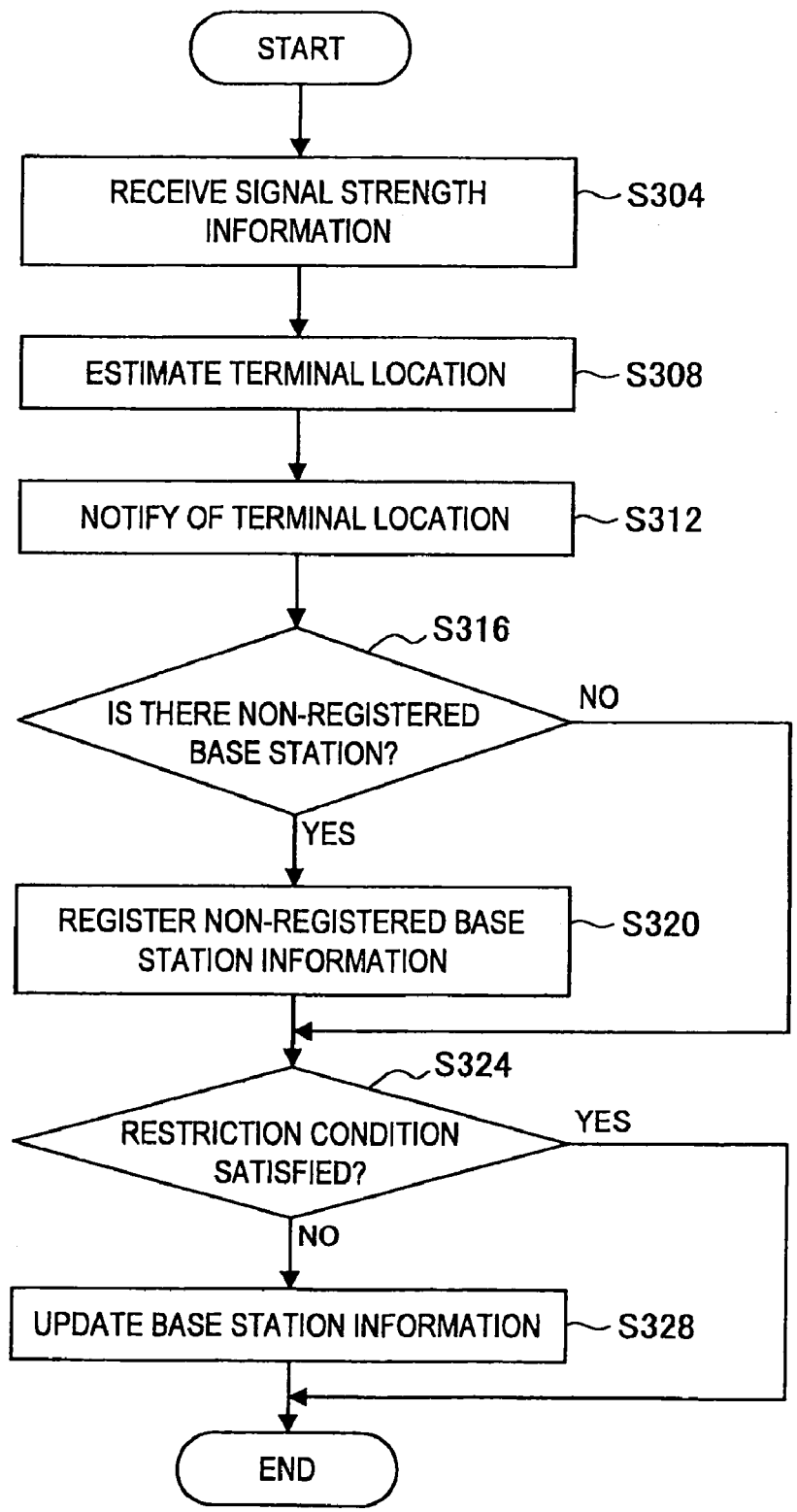
FIG. 11 It is a flow chart showing a flow of an operation in a case a location estimation request is received by the location estimation device from the wireless terminal.
Figure 12:
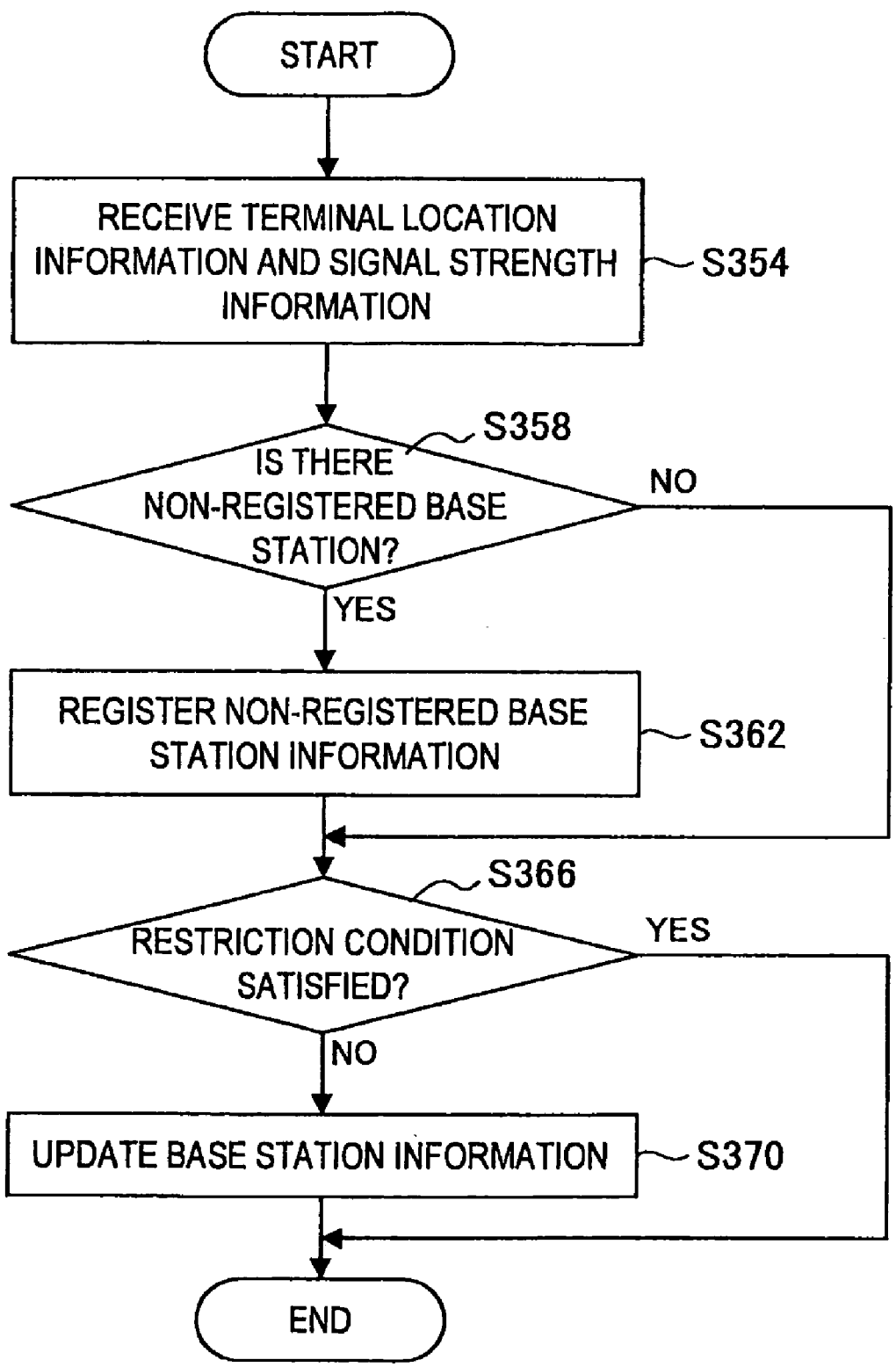
FIG. 12 It is a flow chart showing a flow of an operation in a case a location registration request is received by the location estimation device from the wireless terminal.

Next, a location registration method and a location update method of the location estimation device 20 will be explained with reference to FIGS. 11 and 12. FIG. 11 is a flow chart showing a flow of an operation in a case a location estimation request is received by the location estimation device 20 from the wireless terminal 40. FIG. 12 is a flow chart showing a flow of an operation in a case a location registration request is received by the location estimation device 20 from the wireless terminal 40.

With reference to FIG. 11, first, the location estimation device 20 receives from the wireless terminal 40 the signal strength information along with the location estimation request (S304). Then, the location estimating section 218 of the location estimation device 20 estimates the location of the wireless terminal 40 based on the received signal strength information (S308). Then, the location estimation device 20 notifies the wireless terminal 40 of the estimated location via the communicating section 210 (S312).

Next, the registration judging section 222 of the location estimation device 20 judges whether or not each base station ID included in the signal strength information is registered in the storage section 214 (S316). That is, the registration judging section 222 judges whether or not the signal strength of a base station that is not registered in the storage section 214 is included in the signal strength information. In S316, when it is judged that there is a base station ID that is not registered in the storage section 214 among the base station IDs included in the signal strength information, the registering section 226 registers in the storage section 214 in association with each other the non-registered base station ID and predetermined location information dependent on the location of the wireless terminal 40 (S320).

After S320, or when it is judged in S316 that there is no base station ID that is not registered in the storage section 214 among the base station IDs included in the signal strength information, the base station information judging section 230 judges, based on the signal strength information, whether or not the base station information registered in the storage section 214 satisfies the restriction condition (S324). Then, the updating section 240 updates the base station information that is judged by the base station information judging section 230 as not satisfying the restriction condition (S328).

Further, with reference to FIG. 12, first, the location estimation device 20 receives the signal strength information and the terminal location information along with the location registration request (S354). Next, the registration judging section 222 of the location estimation device 20 judges whether or not each base station ID included in the signal strength information is registered in the storage section 214 (S358). That is, the registration judging section 222 judges whether or not the signal strength of a base station that is not registered in the storage section 214 is included in the signal strength information. In S358, when it is judged that there is a base station ID that is not registered in the storage section 214 among the base station IDs included in the signal strength information, the registering section 226 registers in the storage section 214 the base station information in which the non-registered base station ID and the terminal location information are associated with each other (S362).

After S362, or when it is judged in S358 that there is no base station ID that is not registered in the storage section 214 among the base station IDs included in the signal strength information, the base station information judging section 230 judges, based on the signal strength information and the terminal location information, whether or not the base station information registered in the storage section 214 satisfies the restriction condition (S366). Then, the updating section 240 updates the base station information that is judged by the base station information judging section 230 as not satisfying the restriction condition (S370).

Second Embodiment

As explained above, the location estimation system 10 according to the first embodiment of the present invention has its characteristics in the location estimation device 20 configuring the location estimation system 10. However, with the location estimation system 10 according to the first embodiment, the wireless terminal 40 needs to access the location estimation device 20 every time the wireless terminal 40 checks and uses the self location. As a result, there may be a case where the traffic between the wireless terminal 40 and the location estimation device 20 increases or where it takes time for the wireless terminal 40 to obtain the location estimation result.

Thus, a second embodiment of the present invention has been achieved to solve the problems which may occur in the first embodiment, and according to the location estimation system 10 according to the second embodiment of the present invention, it becomes possible to suppress the traffic between the wireless terminal 40 and the location estimation device 20 and to enable the wireless terminal 40 to swiftly check the self location. With the location estimation system 10 according to the second embodiment as above, not only the location estimation device 20, but also the wireless terminal 40 has a characteristic configuration. Hereunder, the configuration of the wireless terminal 40 according to the present embodiment will be explained. Note that many parts of the configuration of the location estimation device 20 are duplicates of matters explained in the first embodiment, and thus, the detailed explanation will be omitted.

Figure 13:
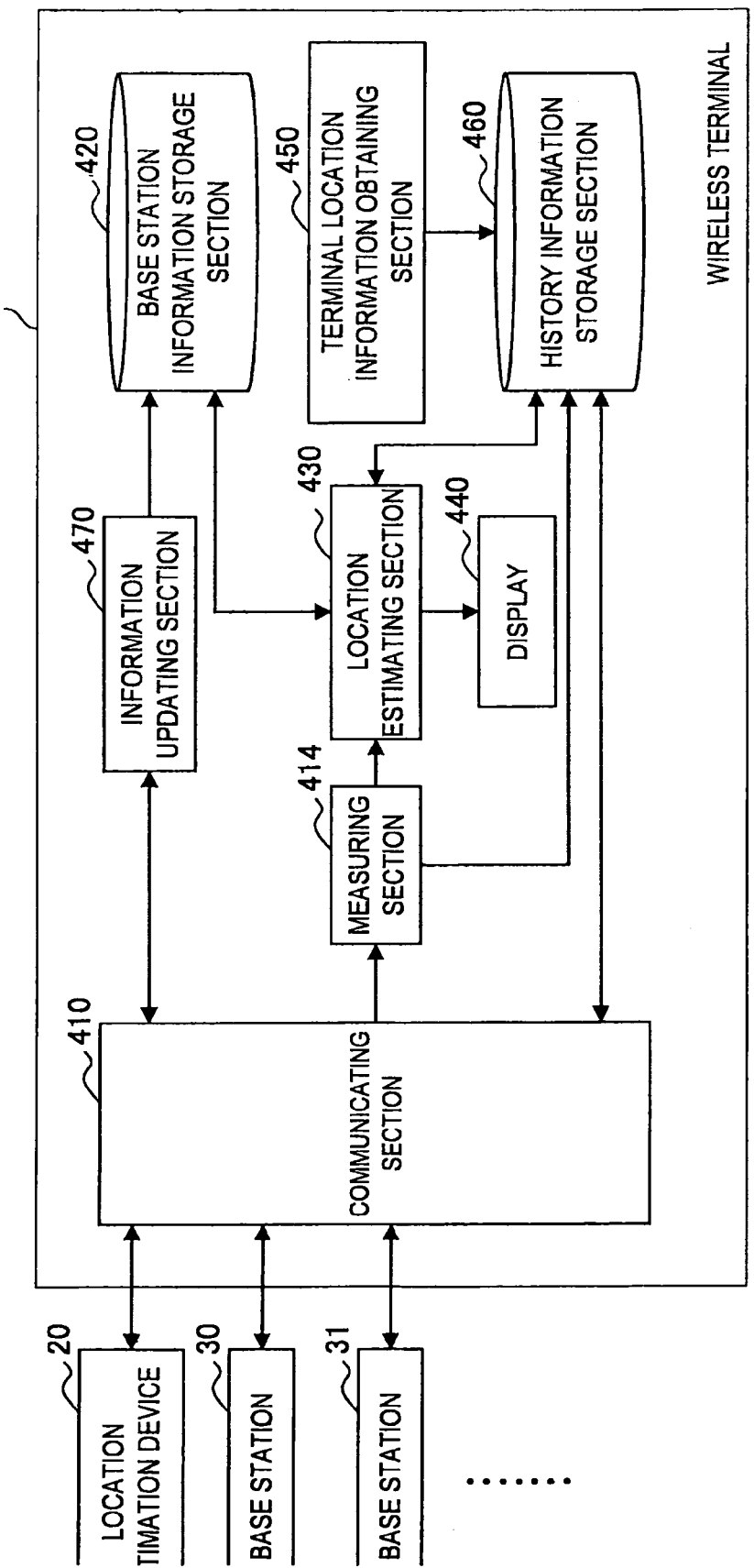
FIG. 13 It is a block diagram showing a configuration of a wireless terminal configuring a location estimation system according to a second embodiment of the present invention.

FIG. 13 is a block diagram showing the configuration of the wireless terminal 40 according to the present embodiment. The wireless terminal 40 includes a communicating section 410, a measuring section 414, a base station information storage section 420, a location estimating section 430, a display 440, a terminal location information obtaining section 450, a history information storage section 460 and an information updating section 470.

The communicating section 410 has a function of a receiving section that receives signals (for example, beacon signals) transmitted from the surrounding base stations 30 and 31, and a function of a transmitting section that transmits history information described later to the location estimation device 20. Further, the communicating section 410 may be a wireless LAN compatible communication device, a GSM compatible communication device, or a Bluetooth compatible communication device.

The measuring section 414 measures the signal strengths of signals that the communicating section 140 received from the surrounding base stations 30, 31 and the like. Then, the measured signal strengths and the base station IDs of the base stations which are the transmission sources of the signals are associated with each other and output to the location estimating section 430 as signal strength information.

The base station information storage section 420 stores base station information in which the base station ID of a base station and location information indicating the installation location of the base station are associated with each other. The configuration of the base station information stored in the base station information storage section 420 is substantially the same as the base station information stored in the storage section 214 of the location estimation device 20 explained using FIG. 3, and thus, the explanation will be omitted.

The location estimating section 430 estimates, in response to the location estimation request from a user, the location of the wireless terminal 40 based on the signal strength information that is input from the measuring section 414 and the base station information stored in the base station information storage section 420. The method by which the location estimating section 430 estimates the location of the wireless terminal 40 is substantially the same as the matters explained for the location estimating section 218 of the location estimation device 20 described above.

The display 440 is a display for displaying the location of the wireless terminal 40 estimated by the location estimating section 430 so that the user can check the location. Note that the display 440 is shown only as an example of an output device, and the output device may be an audio output device such as a speaker, a headphone or the like.

As such, by providing the wireless terminal 40 with a database for storing the base station information, the wireless terminal 40 can estimate the self location without accessing the location estimation device 20. However, the actual registration state of the base station changes with time, and thus, it is needed to accordingly change the base station information registered in the base station information storage section 420 of the wireless terminal 40. The wireless terminal 40 according to the present embodiment is effective in that it can satisfy such need as will be described below.

The terminal location information obtaining section 450 obtains the terminal location information indicating the current location of the wireless terminal 40. Note that the method by which the terminal location information obtaining section 450 obtains the terminal location information is not specified, and for example, the terminal location information obtaining section 450 may obtain the terminal location information based on the location registration request input by a user or may obtain the terminal location information based on the other location estimation functions. Further, the signal strength information can be also obtained by the measuring section 414 at the time of the terminal location information obtaining section 450 obtaining the terminal location information.

The history information storage section 460 stores history information such as the history of the signal strength information based on the measurement by the measuring section 414, the history of the terminal location information obtained by the terminal location information obtaining section 450, and the like. The configurations of the history of the signal strength information and the history of the terminal location information will be explained with reference to FIGS. 14A to C and FIG. 15.

FIGS. 14A to C are explanatory diagrams showing the histories of the signal strength information stored in the history information storage section 460. As shown in FIGS. 14A, 14B and 14C, the history information storage section 460 stores as the history information the signal strength information at a plurality of time points and the time at which the signal strength information is obtained in association with each other. Specifically, FIG. 14A indicates the history of the signal strength information at time point T1, FIG. 14B indicates the history of the signal strength information at time point T2, and FIG. 14C indicates the history of the signal strength information at time point T3. Note that the history information storage section 460 does not necessarily have to store the signal strength information in association with the time point.

FIG. 15 is an explanatory diagram showing the history of the terminal location information stored in the history information storage section 460. As shown in FIG. 15, the history information storage section 460 stores as the history information the terminal location information at a plurality of time points and the time at which the terminal location information is obtained in association with each other. Specifically, in FIG. 15, the history information storage section 460 storing the terminal location information obtained at time points T1, T2 and T3 is shown.

The history information stored in the history information storage section 460 may be transmitted to the location estimation device 20 via the communicating section 410 based on the control by the information updating section 470. When such history information is received, the location estimation device 20 newly registers the base station information that is not registered in the storage section 214 or updates the base station information registered in the storage section 214 as explained in the first embodiment. And the information updating section 470 receives the base station information currently registered in the storage section 214 of the location estimation device 20.

Here, the location estimation device 20 may transmit to the wireless terminal 40 all the base station information currently registered in the storage section 214 or only the difference to the base station information registered in the base station information storage section 420 of the wireless terminal 40. In a case of the location estimation device 20 transmitting all the base station information currently registered in the storage section 214 to the wireless terminal 40, the information updating section 470 can extract the difference between the base station information registered in the base station information storage section 420 and the base station information in the storage section 214 that is received, and reflect the extracted content in the base station information storage section 420. Or, in a case of the wireless terminal 40 receiving all the base station information currently registered in the storage section 214 from the location estimation device 20, the information updating section 470 may also delete all the data in the base station information storage section 420 and newly register all the base station information currently registered in the storage section 214.

Figure 16:
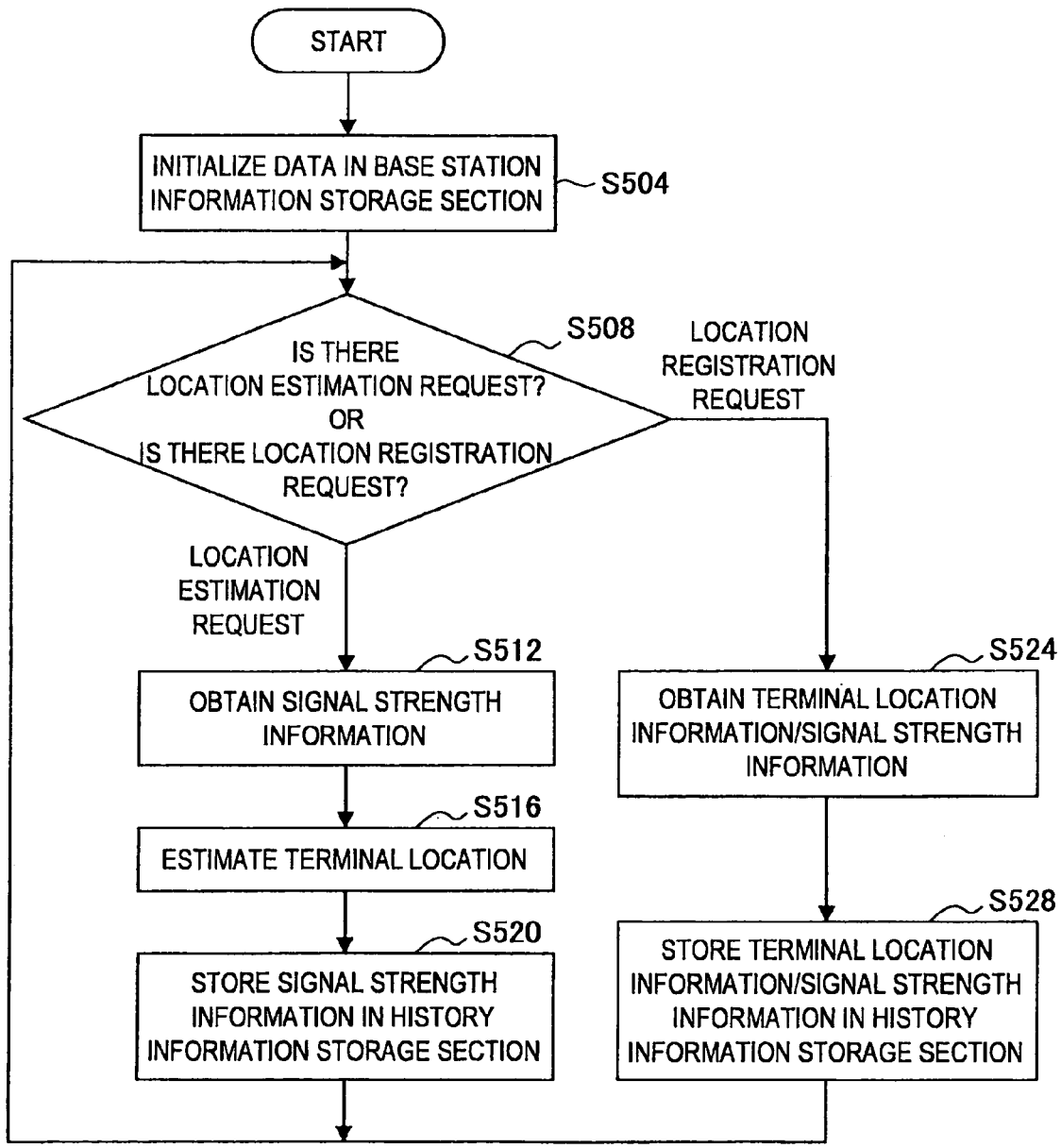
FIG. 16 It is a flow chart showing a flow of an operation of the wireless terminal according to the present embodiment.
Figure 17:
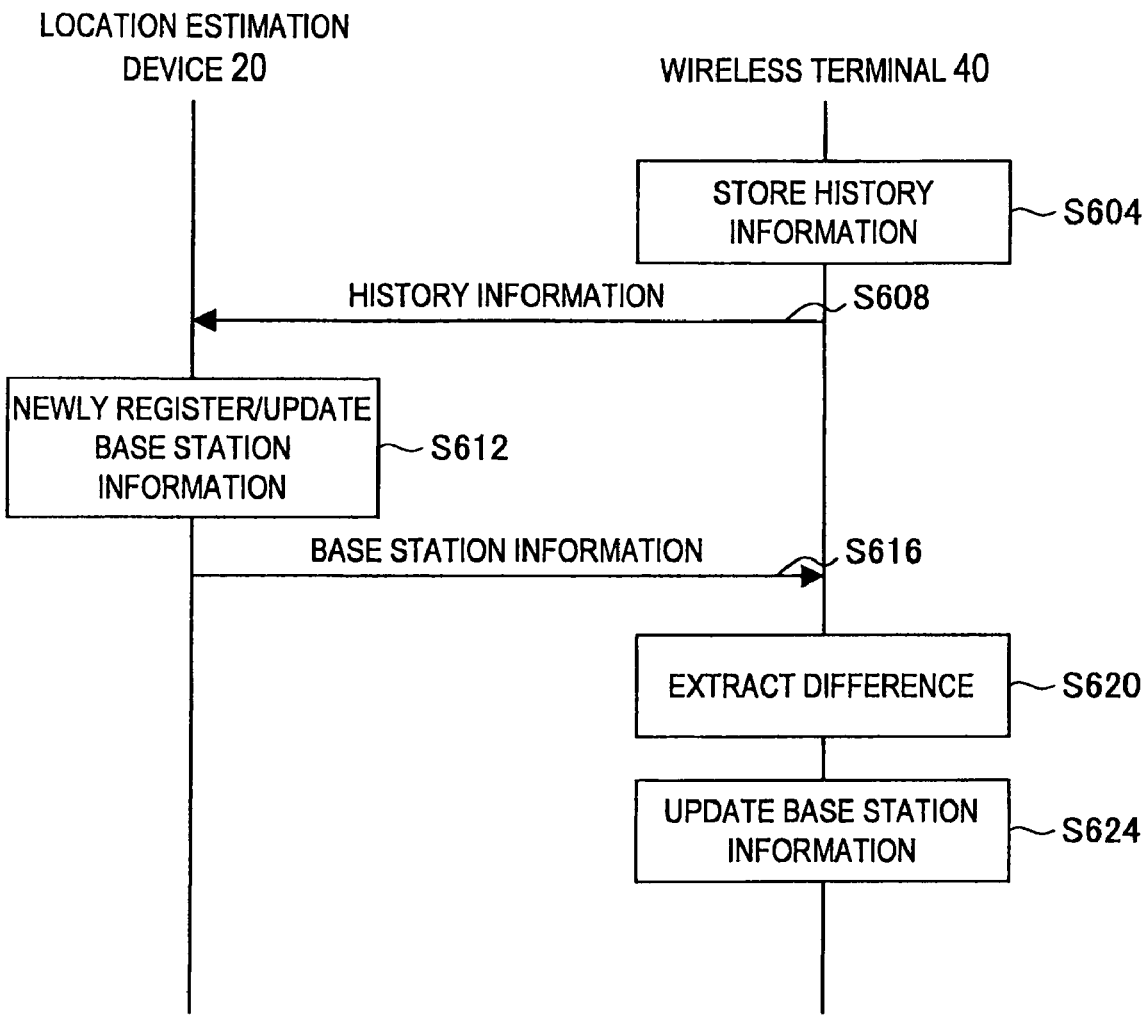
FIG. 17 It is a sequence diagram showing a flow of an operation of a location estimation system according to the present embodiment.

Next, a location registration method and a location update method of the wireless terminal 40 and the location estimation system 10 according to present embodiment will be explained with reference to FIGS. 16 and 17. FIG. 16 is a flow chart showing a flow of an operation of the wireless terminal 40 according to the present embodiment. FIG. 17 is a sequence diagram showing a flow of an operation of the location estimation system 10 according to the present embodiment.

As shown in FIG. 16, first, the wireless terminal 40 initializes the base station information in the base station information storage section 420 (S504). As the initialization, the base station information registered in the storage section 214 of the location estimation device 20 may be received and the received base station information may be registered in the base station information storage section 420, or the base station information may be received from a server providing the locations of other base stations and the received base station information may be registered iii the base station information storage section 420.

Next, the wireless terminal 40 judges whether there is a location estimation request or there is a location registration request (S508). In a case there is a location estimation request, the wireless terminal 40 obtains the signal strength information based on the operation of the measuring section 414 (S512). Then, the location estimating section 430 estimates the location of the wireless terminal 40 based on the signal strength information and the base station information registered in the base station information storage section 420 (S516). Then, the measuring section 414 or the location estimating section 430 makes the history information storage section 460 store the signal strength information (S520).

On the other hand, in a case there is a location registration request, the wireless terminal 40 obtains the signal strength information based on the operation of the measuring section n414 and obtains the terminal location information based on the operation of the terminal location information obtaining section 450 (S524). Next, the measuring section 414 and the terminal location information obtaining section 450 make the history information storage section 460 store the signal strength information and the terminal location information (S528).

Next, as shown in FIG. 17, when the history information storage section 460 of the wireless terminal 40 stores the history information (S604), the wireless terminal 40 transmits the history information to the location estimation device 20 at a predetermined timing (S608). Here, the predetermined timing may be when the history information is accumulated to a certain amount, when a predetermined time has passed from the previous transmission of the history information, or when there is a request from the location estimation device 20.

Next, based on the received history information, the location estimation device 20 newly registers the base station information in the storage section 214 or updates the base station information registered in the storage section 214 (S612). Then, the location estimation device 20 transmits the base station information after change to the wireless terminal 40 (S616). Next, the information updating section 470 of the wireless terminal 40 extracts the difference between the received base station information and the base station information registered in the base station information storage section 420 (S620). Then, based on the extracted difference, the information updating section 470 updates or changes the base station information registered in the base station information storage section 420 (S624).

As explained above, according to the location estimation device 20 according to the first embodiment of the present invention, the base station information stored in the storage section 214 can be gradually supplemented based on the signal strength information received from the wireless terminal 40. That is, the location estimation device 20 can save the trouble of manually initializing the base station information in the location estimation device 20 and can automatically acquire the actual installation state of the base station.

Further, according to the location estimation device 20 according to the first embodiment of the present invention, the base station information registered in the storage section 214 can be automatically updated based on the operations of the base station information judging section 230 and the updating section 240. For example, even when the installation location of the base station registered in the storage section 214 is changed, the location estimation device 20 can reflect in the base station information registered in the storage section 214 the location of the base station whose installation location has been changed without requiring manual processing.

Further, according to the wireless terminal 40 according to the second embodiment of the present invention, since the wireless terminal 40 is provided with the base station information storage section 420 for storing the base station information, the wireless terminal 40 can estimate the self location without accessing the location estimation device 20. Further, the base station information stored in the base station information storage section 420 of the wireless terminal 40 can be changed accordingly to the base station information registered in the location estimation device 20.

Note that the preferred embodiments of the present invention have been explained with reference to the appended drawings. However, it is needles to say that the present invention is not limited to such examples. It is obvious that various modifications and alterations may be achieved by those skilled in the art within the scope of the claims, and it is understood that they are naturally within the scope of the claims.

For example, in the above-described embodiment, an example has been explained where the registration judging section 222 judges whether or not each base station ID included in the received signal strength information is registered in the storage section 214. However, all the possible base station IDs may be registered in the storage section 214 without being associated with the location information. In this case, the registration judging section 222 may judge whether or not each base station ID included in the received signal strength information is registered in the storage section 214 in association with the location information.

Further, in the first embodiment, an example has been explained where the location estimation device 20 and the wireless terminal 40 are configured separately. However, it is not limited to such an example, and it is possible to integrally configure the location estimation device 20 and the wireless terminal 40. In this case, the location estimation device 20 can receive the signal strength information of not only the wireless terminal 40 which is integrally configured, but also other wireless terminals, and update the storage section 214.

Each of the steps to be performed by the location estimation system 10 in this specification need not necessarily be performed chronologically in the order shown in the flow charts or the sequence diagram, and processing to be executed in parallel or individually (for example, parallel processing or object processing) may also be included.

Further, a program for causing a computer to perform the location registration method or the location update method as described above and a storage medium in which the program is stored are also provided.

What is claimed is:
1. A location storage device comprising:
a storage section in which location information of a base station that performs wireless communication with a wireless terminal and base station identification information assigned to each base station are registered in association with each other;
a receiving section for receiving signal strength information in which a signal strength of a signal received by the wireless terminal from the base station or information obtained from the signal strength and the base station identification information of the base station that transmitted the signal are associated with each other;

a registration judging section for judging, by referring to the base station identification information registered in the storage section, whether or not the base station identification information included in the signal strength information received by the receiving section is registered in the storage section in association with the location information; and a registering section for registering in the storage section in association with each other the base station identification information judged by the registration judging section as not registered in the storage section and predetermined location information dependent on the location of the wireless terminal.

2. The location storage device according to claim 1, further comprising:

a location estimating section for estimating the location of the wireless terminal based on the signal strength information and the location information of the base station that is registered in the storage section, wherein the registering section registers in the storage section in association with each other the base station identification information judged by the registration judging section as not registered in the storage section and the location information indicating the location of the wireless terminal estimated by the location estimating section.

3. The location storage device according to claim 1, wherein:

the receiving section further receives terminal location information indicating the location of the wireless terminal; and the registering section registers in the storage section in association with each other the base station identification information judged by the registration judging section as not registered in the storage section and the terminal location information received by the receiving section.

4. The location storage device according to claim 1, wherein:

the receiving section receives the signal strength information at one or two or more time points accumulated in the wireless terminal.

5. A location storage device comprising:

a storage section in which location information of a base station that performs wireless communication with a wireless terminal and base station identification information assigned to each base station are registered in association with each other;

a receiving section for receiving signal strength information in which a signal strength of a signal received by the wireless terminal from the base station or information obtained from the signal strength and the base station identification information of the base station that transmitted the signal are associated with each other;

a base station information judging section for performing, on the location information of the base station registered in the storage section, a judgment relating to a predetermined condition which is based on the distance between the wireless terminal and the base station that is estimated from the signal strength information; and an updating section for updating the location information of the base station based on the judgment result of the base station information judging section.

6. The location storage device according to claim 5, wherein:

the base station information judging section comprises an inter-base-station-distance calculating section for calculating the distance between a first base station and a second base station that perform wireless communication with the wireless terminal based on the location information of the first base station and the second base station registered in the storage section;

an estimated distance adding section for adding up the distance between the wireless terminal and the first base station and the distance between the wireless terminal and the second base station that are estimated from the signal strength information; and a condition judging section for judging that the condition is not satisfied when there is a difference between the distance calculated by the inter-base-station-distance calculating section and the distance calculated by the estimated distance adding section.

7. The location storage device according to claim 6, wherein:

the condition judging section judges that the condition is not satisfied when the distance calculated by the inter-base-station-distance calculating section is longer than the distance calculated by the estimated distance adding section by a set boundary value or more.

8. The location storage device according to claim 6, wherein:

the updating section updates the location information of the base station registered in the storage section so that the distance between the first base station and the second base station is within the range of the distance between the location indicated by the location information of the first base station and the location indicated by the location information of the second base station that are registered in the storage section and a distance that is a sum of the distance between the wireless terminal and the first base station and the distance between the wireless terminal and the second base station.

9. The location storage device according to claim 5, wherein:

the receiving section further receives terminal location information indicating the location of the wireless terminal; and the base station information judging section further includes a registration distance calculating section for calculating the distance between the location indicated by the terminal location information received by the receiving section and the location indicated by the location information of a certain base station registered in the storage section, and a condition judging section for judging that the condition is not satisfied when there is a difference between the distance calculated by the registration distance calculating section and the distance between the wireless terminal and the certain base station estimated based on the signal strength corresponding to the certain base station.

10. The location storage device according to claim 9, wherein:

the condition judging section judges that the condition is not satisfied when the distance calculated by the registration distance calculating section is shorter than the distance between the wireless terminal and the certain base station estimated based on the signal strength corresponding to the certain base station.

11. The location storage device according to claim 10, wherein:

the updating section updates the location information of the base station registered in the storage section so that the distance between the certain base station and the wireless terminal is within the range of the distance between the location indicated by the terminal location information received by the receiving section and the location indicated by the location information of the certain base station registered in the storage section and the distance between the wireless terminal and the certain base station estimated based on the signal strength information.

12. The location storage device according to claim 5, wherein:

the receiving section receives the signal strength information at one or two or more time points accumulated in the wireless terminal.

13. A wireless terminal for performing wireless communication with a plurality of base stations, the wireless terminal comprising:

a measuring section for measuring signal strengths of signals received from the plurality of the base stations;

a history information storage section for storing a history of signal strength information, at one or two or more time points, in which the signal strengths measured by the measuring section or information obtained from the signal strengths and base station identification information assigned to each of the base stations are associated with each other;

a transmitting section for transmitting the history of the signal strength information stored in the history information storage section to a location storage device capable of estimating the location of the wireless terminal based on the signal strength information;

a base station information storage section in which base station information in which location information of the plurality of the base stations and the base station identification information are associated with each other is registered; and a location estimating section for estimating the location of the wireless terminal based on the base station information registered in the base station information storage section and the signal strength information.

14. The wireless terminal according to claim 13, wherein:

the history information storage section has further registered therein a history of terminal location information indicating the location of the wireless terminal at one or two or more time points; and the transmitting section transmits to the location storage device the histories of the signal strength information and the terminal location information.

15. The wireless terminal according to claim 13, further comprising:

an information updating section for updating base station information registered in the base station information storage section to base station information registered in a storage section of the location storage device and in which location information of the plurality of the base stations and the base station identification information assigned to each of the base stations are associated with each other.

16. A location storage system comprising a wireless terminal that performs wireless communication with a plurality of base stations and a location storage device in which locations of the plurality of the base stations are registered, wherein:

the wireless terminal includes a measuring section for measuring signal strengths of signals received from the plurality of the base stations; and a transmitting section for transmitting to the location storage device signal strength information, at one or two or more time points, in which the signal strengths measured by the measuring section or information obtained from the signal strengths and base station identification information assigned to each of the base stations are associated with each other, and the location storage device includes a storage section in which location information of the base station and the base station identification information are registered in association with each other;

a receiving section for receiving the signal strength information from the wireless terminal;

a registration judging section for judging, by referring to the base station identification information registered in the storage section, whether or not the base station identification information included in the signal strength information received by the receiving section is registered in the storage section; and a registering section for registering in the storage section in association with each other the base station identification information judged by the registration judging section as not registered in the storage section and predetermined location information dependent on the location of the wireless terminal.

17. A location storage system comprising a wireless terminal that performs wireless communication with a plurality of base stations and a location storage device in which locations of the plurality of the base stations are registered, wherein:

the wireless terminal includes a measuring section for measuring signal strengths of signals received from the plurality of the base stations; and a transmitting section for transmitting to the location storage device signal strength information, at one or two or more time points, in which the signal strengths measured by the measuring section or information obtained from the signal strengths and base station identification information assigned to each of the base stations are associated with each other, and the location storage device includes a storage section in which location information of the base station and the base station identification information are registered in association with each other;

a receiving section for receiving the signal strength information from the wireless terminal;

a base station information judging section for performing on the location information of the base station registered in the storage section, a judgment relating to a predetermined condition which is based on the distance between the wireless terminal and the base station that is estimated from the signal strength information; and an updating section for updating the location information of the base station based on the judgment result of the base station information judging section.

18. A location registration method performed by a computer, the method comprising the steps of:

registering, by the computer, in a storage medium in association with each other location information of a base station that performs wireless communication with a wireless terminal and base station identification information assigned to each base station;

receiving signal strength information in which a signal strength of a signal received by the wireless terminal from the base station or information obtained from the signal strength and the base station identification information of the base station that transmitted the signal are associated with each other;

judging, by referring to the base station identification information registered in the storage medium, whether or not the base station identification information included in the received signal strength information is registered in the storage medium; and registering in the storage medium in association with each other the base station identification information judged as not registered in the storage medium and predetermined location information dependent on the location of the wireless terminal.

19. A location update method performed by a computer, the method comprising the steps of:

registering, by the computer, in a storage medium in association with each other location information of a base station that performs wireless communication with a wireless terminal and base station identification information assigned to each base station;

receiving signal strength information in which a signal strength of a signal received by the wireless terminal from the base station or information obtained from the signal strength and the base station identification information of the base station that transmitted the signal are associated with each other;

performing, on the location information of the base station registered in the storage medium, a judgment relating to a predetermined condition which is based on the distance between the wireless terminal and the base station that is estimated from the signal strength information; and updating the location information of the base station based on the judgment result for the predetermined condition.

20. A non-transitory computer-readable storage medium storing a program for causing a computer to function as a location storage device, the location storage device comprising:

a receiving section for receiving signal strength information in which a signal strength of a signal received by a wireless terminal from a base station that performs wireless communication with the wireless terminal or information obtained from the signal strength and base station identification information of the base station that transmitted the signal are associated with each other;

a registration judging section for judging, by referring to the base station identification information registered in a storage medium in association with location information of the base station, whether or not the base station identification information included in the signal strength information received by the receiving section is registered in the storage medium; and a registering section for registering in the storage medium in association with each other the base station identification information judged by the registration judging section as not registered in the storage medium and predetermined location information dependent on the location of the wireless terminal.

21. A non-transitory computer-readable storage medium storing a program for causing a computer to function as a location storage device, the location storage device comprising:

a receiving section for receiving signal strength information in which a signal strength of a signal received by a wireless terminal from a base station that performs wireless communication with the wireless terminal or information obtained from the signal strength and base station identification information of the base station that transmitted the signal are associated with each other;

a base station information judging section for performing, on location information of the base station registered in a storage medium in association with the base station identification information of the base station, a judgment relating to a predetermined condition which is based on the distance between the wireless terminal and the base station that is obtained from the signal strength information; and an updating section for updating the location information of the base station based on the judgment result of the base station information judging section.

* * * * *